(12) United States Patent
Doan et al.

(10) Patent No.: US 10,296,206 B2
(45) Date of Patent: May 21, 2019

(54) MULTI-FINGER TOUCHPAD GESTURES

(71) Applicant: Microsoft Technology Licensing, LLC, Redmond, WA (US)

(72) Inventors: Christopher Doan, Seattle, WA (US); Matthew I. Worley, Bellevue, WA (US); Tyler J. Donahue, Bellevue, WA (US); Emily Grace Sappington, Seattle, WA (US); Sohit Karol, Seattle, WA (US); Nidhi S. Sanghai, Newcastle, WA (US); Miron Vranjes, Seattle, WA (US); Matthew Kiichi Slemon, Bellevue, WA (US); Andrew P. Mittereder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 14/494,432

(22) Filed: Sep. 23, 2014

(65) Prior Publication Data
US 2016/0085438 A1 Mar. 24, 2016

(51) Int. Cl.
*G06F 3/0488* (2013.01)
*G06F 3/0481* (2013.01)
(Continued)

(52) U.S. Cl.
CPC ........ *G06F 3/04883* (2013.01); *G06F 3/0481* (2013.01); *G06F 3/0486* (2013.01); *G06F 3/04842* (2013.01); *G06F 2203/04808* (2013.01)

(58) Field of Classification Search
CPC .... G06F 3/03547; G06F 3/017; G06F 3/0488; G06F 12/0811; G06F 2203/04808;
(Continued)

(56) References Cited

U.S. PATENT DOCUMENTS

| 7,030,861 B1 | 4/2006 | Westerman et al. |
| 7,728,823 B2 | 7/2010 | Lyon et al. |

(Continued)

OTHER PUBLICATIONS

"Second Written Opinion", Application No. PCT/US2015/051292, dated Oct. 11, 2016, 8 pages.
(Continued)

*Primary Examiner* — Tadesse Hailu

(57) ABSTRACT

A multi-finger touchpad gesture refers to a movement of multiple fingers in a particular pattern across a touchpad. The touchpad senses the multiple fingers, and based on the sensed finger locations and finger movements, one of multiple multi-finger touchpad gestures is detected. A user interface being presented on a display is altered as appropriate in response to the detected multi-finger touchpad gesture. Various different multi-finger touchpad gestures can be detected. The multi-finger touchpad gestures can include a gesture that traverses different hierarchical views of the operating system user interface, a gesture that switches between two recent windows, a gesture that traverses a back stack of windows, a gesture that displays a window selection view and selects a particular window, and a gesture that moves a window to a different location (including snapping a window to an edge or corner of the display).

11 Claims, 18 Drawing Sheets

(51) Int. Cl.
*G06F 3/0486* (2013.01)
*G06F 3/0484* (2013.01)

(58) Field of Classification Search
CPC .............. G06F 3/0481; G06F 3/04883; G06F 3/048842; G06F 3/0486
USPC ....................................................... 715/863
See application file for complete search history.

(56) References Cited

U.S. PATENT DOCUMENTS

| | | | |
|---|---|---|---|
| 7,979,809 | B2 | 7/2011 | Sunday |
| 2007/0177803 | A1 | 8/2007 | Elias et al. |
| 2009/0009366 | A1* | 1/2009 | Chiu ................... G06F 3/04855 341/20 |
| 2010/0110025 | A1* | 5/2010 | Lim .................... G06F 3/03547 345/173 |
| 2012/0092381 | A1 | 4/2012 | Hoover et al. |
| 2012/0096349 | A1 | 4/2012 | Zheng et al. |
| 2012/0235938 | A1* | 9/2012 | Laubach ............... G06F 3/0416 345/173 |
| 2012/0245745 | A1* | 9/2012 | Vandevelde ............ H02S 50/00 700/286 |
| 2013/0179838 | A1 | 7/2013 | LeVee et al. |
| 2013/0227472 | A1* | 8/2013 | Sosinski ............... G06F 3/0481 715/794 |
| 2013/0241847 | A1 | 9/2013 | Shaffer et al. |
| 2014/0075388 | A1 | 3/2014 | Kuscher et al. |
| 2014/0195907 | A1 | 7/2014 | Lim |
| 2014/0361982 | A1* | 12/2014 | Shaffer ................... G06F 3/017 345/156 |
| 2015/0186397 | A1* | 7/2015 | Cueto ............... G06F 17/30126 715/854 |

OTHER PUBLICATIONS

"Mac Basics: Multi-Touch Gestures", Retrieved From: <http://support.apple.com/kb/ht4721> Aug. 6, 2014, Nov. 1, 2013, 6 Pages.
"Synaptics Gesture Suite", Retrieved From: <http://www.synaptics.com/en/gesture-suite-windows.php> Aug. 6, 2014, May 29, 2014, 7 Pages.
Linder, "List of Windows 8 Touch-Based Gestures", Retrieved From: <http://liliputing.com/2012/03/list-of-windows-8-touch-based-gestures.html> Aug. 6, 2014, Mar. 13, 2012, 7 Pages.
Peschier, "Creating a Touch-Based Task Switcher", In Proceedings: Master Thesis 30EC, May 27, 2011, 75 Pages.
Scott, et al., "I Sense a Disturbance in the Force: Mobile Device Interaction with Force Sensing", In Proceedings: Technical Report MSR-TR-2008-57, 2008, 10 Pages.
Wawro, "Master Windows 8 Gesture Commands", Retrieved From: <http://www.pcworld.com/article/2013022/master-windows-8-gesture-commands.html> Aug. 6, 2014, Oct. 29, 2012, 12 Pages.
"International Search Report & Written Opinion Issued in PCT Application No. PCT/US2015/051292", dated Dec. 7, 2015, 13 Pages.
"International Preliminary Report on Patentability", Application No. PCT/US2015/051292, dated Dec. 16, 2016, 10 pages.

* cited by examiner

MULTI-FINGER TOUCHPAD GESTURES

BACKGROUND

As computing technology has advanced, the manner in which inputs are provided to devices has changed. Although inputs used to be provided to a computing device using a keyboard, various other input mechanisms are now available such as touchpads, mice, microphones, motion sensors, and so forth. Different types of actions are typically easier for users when using different types of input mechanisms, such as typing of a particular letter being easier on a keyboard than a touchpad. This can result in the user needing to switch to different types of input mechanisms to provide inputs with different types of actions, which can be frustrating for users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method includes receiving a user input that is a gesture on a touchpad, the user input comprising multiple fingers sensed by the touchpad concurrently for at least part of the gesture and moving in a particular pattern across the touchpad. Based on a pattern of the user input, a determination is made of which of multiple multi-finger touchpad gestures is indicated by the user input. The determination includes in response to the indicated gesture being a traverse hierarchical views multi-finger touchpad gesture, a different hierarchical view of an operating system user interface of the computing device is changed to; in response to the indicated gesture being a switch between recent windows multi-finger touchpad gesture or a traverse back stack of windows multi-finger touchpad gesture, a different one of multiple windows in a back stack of windows is switched to, the back stack of windows comprising an indication of an order in which windows on the computing device were most recently a current window; in response to the indicated gesture being a scrubbing window selection multi-finger touchpad gesture, a window selection view is displayed, the window selection view including multiple thumbnails of windows of the computing device via which directional movement on the touchpad can result in selecting one of the multiple thumbnails and switching to the window represented by the selected thumbnail; or in response to the indicated gesture being a window movement multi-finger touchpad gesture, the current window is moved to a user-selected location on the display.

In accordance with one or more aspects, a device includes one or more processors, and one or more computer-readable storage media having stored thereon multiple instructions. The multiple instructions, when executed by the one or more processors, cause the one or more processors to receive a user input that is a gesture on a touchpad, the user input comprising multiple fingers concurrently moving across the touchpad for at least part of the gesture. The multiple instructions further cause the one or more processors to determine whether a direction of movement is in one of two directions, the two directions being approximately opposite one another, change a view of the operating system user interface to a next higher hierarchical view of multiple operating system UI hierarchical views in response to the direction of movement being a first direction of the two directions, and change a view of the operating system user interface to a next lower hierarchical view of the multiple operating system UI hierarchical views in response to the direction of movement being a second direction of the two directions.

In accordance with one or more aspects, a device includes one or more processors, and one or more computer-readable storage media having stored thereon multiple instructions. The multiple instructions, responsive to execution by the one or more processors, cause the one or more processors to perform operations including receiving a first part of a user input that is a gesture on a touchpad, the first part of the user input comprising multiple fingers concurrently moving across the touchpad for at least part of the gesture, and displaying, in response to the first part of the user input, a window selection view including multiple representations of windows of the device. The operations further include receiving a second part of the user input that is a directional movement on the touchpad, at least one of the multiple fingers that was sensed by the touchpad during the first part of the user input remaining sensed by the touchpad during the second part of the user input, identifying selection of one of the windows represented in the window selection view, and making the selected one window a current window.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
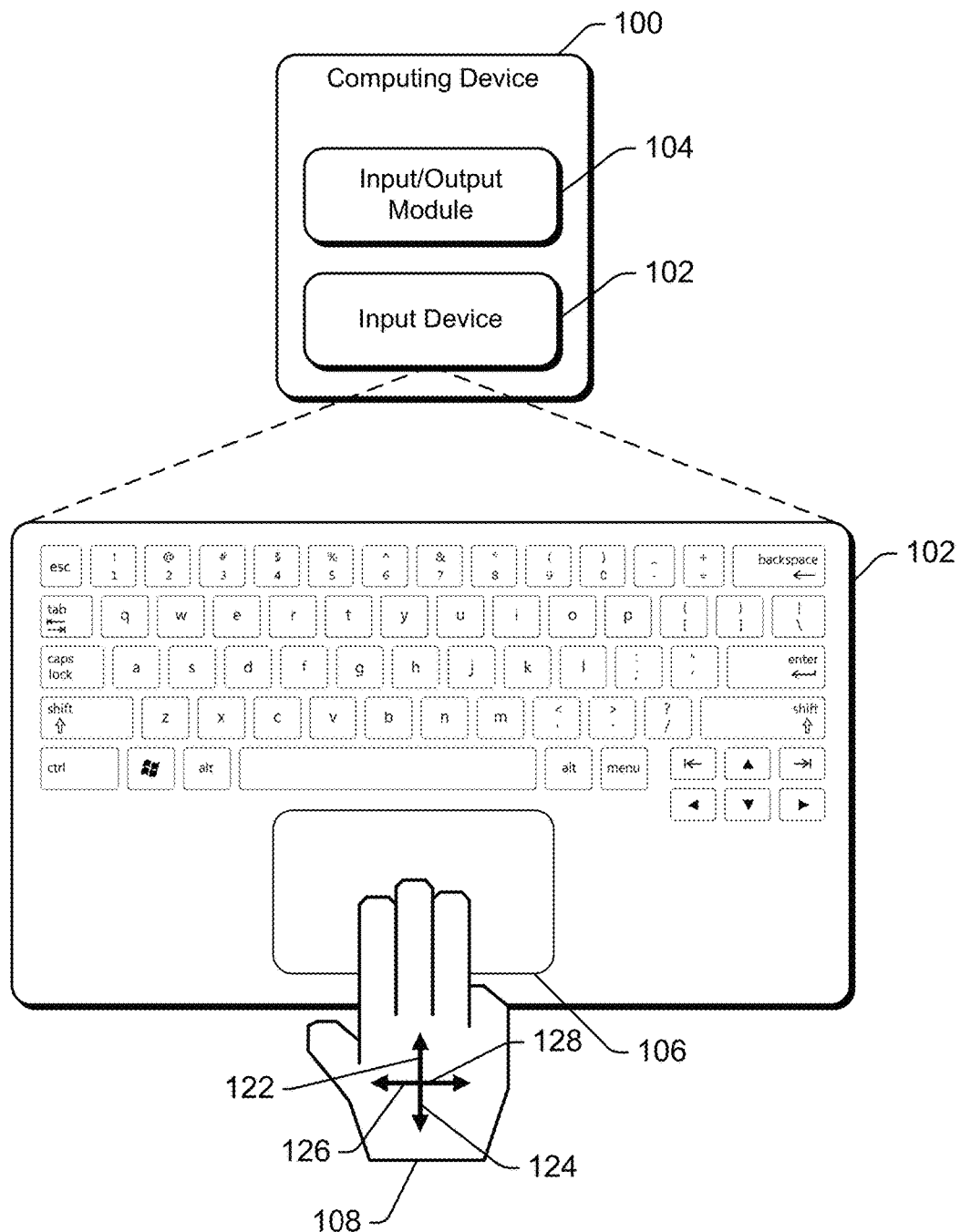
FIG. 1 is a block diagram illustrating an example computing device implementing the multi-finger touchpad gestures in accordance with one or more embodiments.

Multi-finger touchpad gestures are discussed herein. A multi-finger touchpad gesture refers to a movement of multiple fingers in a particular pattern across a touchpad. The touchpad senses the multiple fingers, and based on the sensed finger locations and finger movements, one of multiple multi-finger touchpad gestures is detected. A user interface being presented on a display is altered as appropriate in response to the detected multi-finger touchpad gesture.

Various different multi-finger touchpad gestures can be detected. The multi-finger touchpad gestures can include a gesture that causes the user interface to traverse different hierarchical views of the operating system user interface (UI), a gesture that causes the operating system UI to switch between two recent windows, a gesture that causes the operating system UI to traverse a back stack or history of windows, a gesture that causes the user interface to display a windows selection view allowing the user to switch to any open window, and a gesture that causes the user interface to move a window to a different location (including snapping a window to an edge or corner of the display). These various different multi-finger touchpad gestures are discussed in additional detail below. Although specific touchpad gestures are discussed herein, it should be noted that various other touchpad gestures performing other operations can also be detected, such as gestures to search the Web, gestures to open a natural language user interface or virtual assistant, gestures to look up the definition of a word, and so forth.

The touchpad gestures are multi-finger and thus are made with multiple fingers. The gestures can be made with any number (two or more) of multiple fingers. Although examples of multi-finger touchpad gestures herein may refer to three fingers, the gestures apply analogously to two or more fingers. Furthermore, the number of fingers used in a multi-finger touchpad gesture can change over the course of the gesture. For example a multi-finger touchpad gesture may begin with three fingers, and the user may touch the touchpad with an additional finger or lift one or more fingers from the touchpad (so that the one or more fingers are no longer sensed by the touchpad) for the remainder of the gesture.

In one or more embodiments, the beginning or start of a multi-finger touchpad gesture is done with multiple fingers. The beginning or start of a multi-finger touchpad gesture refers to an initial threshold amount of time (e.g., movement of the multiple fingers in a particular direction for at least 1 second) or an initial threshold distance (e.g., movement of the multiple fingers at least 1 centimeter in a particular direction) of the gesture. The multi-finger touchpad gesture can be completed with additional or fewer fingers (including a single finger). The gesture is completed in response to the multiple fingers moving in accordance with a particular pattern (e.g., in one or more particular directions) for at least the start of the gesture, and one or more of the multiple fingers continuing in the same direction for the remainder of the particular pattern (e.g., for at least a threshold distance, such as 2 centimeters or 10% of the width or height of the touchpad). For example, the beginning of the multi-finger touchpad gesture may be the user moving three fingers in a particular direction (e.g., up, right, etc.) on the touchpad for 2 centimeters, at which point one finger is no longer sensed by the touchpad but the user continues moving the other two fingers in the same direction to complete the gesture.

Example Environments

FIG. 1 is a block diagram illustrating an example computing device 100 implementing the multi-finger touchpad gestures in accordance with one or more embodiments. The computing device 100 can be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes an input device 102 and an input/output module 104. In the illustrated example, the input device 102 is configured as having a keyboard with a QWERTY arrangement of keys, although other arrangements of keys are also contemplated, and a touchpad 106. In the illustrated example, the touchpad 106 is below the keyboard of the input device, although other locations of the touchpad 106 relative to the keyboard are contemplated. Configurations in which the input device 102 includes the touchpad 106 but includes no keyboard are also contemplated. Further, other non-conventional configurations of the input device 102 are also contemplated, such as a game controller, a remote control device, a configuration to mimic a musical instrument, and so forth. Thus, the input device 102, keys incorporated by the input device 102, and the touchpad 106 may assume a variety of different configurations to support a variety of different functionality.

The input/output module 104 is representative of functionality relating to processing of inputs and rendering outputs of the computing device 100. A variety of different inputs may be processed by the input/output module 104, such as inputs relating to functions that correspond to keys of the input device 102, inputs of multi-finger gestures via the touchpad 106, and so forth. The input/output module 104 may support a variety of different inputs by recognizing and leveraging a division between different multi-finger gestures, as discussed in more detail below.

The computing device 100 can include, or be coupled to, a display device via which various data and information can be displayed. The data and information displayed can be created by the input/output module 104 or obtained from other modules of the computing device 100. This data and information can be, for example, a display of a user interface (UI). The data and information can be displayed by a display device of the computing device 100, or alternatively the input/output module 104 can generate one or more signals that are output to a display device that is separate from the computing device 100.

The touchpad 106 senses one or more objects (e.g., fingers) touching or in close physical proximity to (e.g., a threshold distance of, such as 5 millimeters) the touchpad 106. It should be noted that the objects sensed by the touchpad 106 can be fingers, although other objects can similarly be sensed by the touchpad 106. In the discussions herein referring to multi-finger touchpad gestures or sensing of fingers by the touchpad 106, the discussions apply analogously to other objects and need not be fingers (or can include a combination of fingers and other objects).

The touchpad 106 can be implemented using any of a variety of different input sensing technologies. These input sensing technologies may include pressure sensitive systems that sense pressure or force. These input sensing technologies may also include capacitive systems and/or resistive systems that sense touch. These input sensing technologies may also include optical based images that sense reflection or disruption of light from objects touching (or close to) the surface of the touchpad 106, such as Sensor in Pixel (SIP) systems, Infrared systems, optical imaging systems, and so forth. Other types of input sensing technologies can also be used, such as surface acoustic wave systems, acoustic pulse recognition systems, dispersive signal systems, and so forth. Although examples of input sensing technologies are discussed herein, other input sensing technologies are also contemplated.

The touchpad 106 receives user input in the form of movement of multiple fingers, shown as three fingers of a hand 108. The touchpad 106 senses one or more fingers, and provides an indication of the sensed finger locations and movement of the sensed fingers to the input/output module 104. A speed or rate of movement of the sensed fingers can also be determined by the touchpad 106 or the input/output module 104. The input/output module 104 compares the sensed finger locations and movements to various different criteria to determine which, if any, multi-finger touchpad gestures the user input represents. In response to detection of user input that represents a particular multi-finger touchpad gesture, the input/output module 104 alters a user interface presented by the input/output module 104 as appropriate based on the detected multi-finger touchpad gesture.

Movement of the fingers of the hand 108 in different patterns across the touchpad 106 corresponds to different multi-finger touchpad gestures, and results in different changes to the operating system user interface. These patterns are discussed herein with reference to particular directions of movement of the multiple fingers. In the discussions herein, movement in the direction of arrow 122 (towards the keyboard) is referred to as movement "up" or in the up direction, movement in the direction of arrow 124 (away from the keyboard) is referred to as movement "down" or in the down direction, movement in the direction of arrow 126 (along the keyboard) is referred to as movement "left" or in the left direction, and movement in the direction of arrow 128 (along the keyboard) is referred to as movement "right" or in the right direction, In one or more embodiments, the touchpad 106 is an input-only device, sensing one or more fingers or other objects touching or in close physical proximity to the touchpad 106. In such embodiments, the touchpad 106 does not include any output functionality, and is separate from any display component (e.g., the touchpad 106 and the display device on which data is displayed are two separate devices). Alternatively, the touchpad 106 can be an input/output device, in which case the touchpad 106 does include input functionality. For example, the touchpad 106 can be part of a touchscreen, via which the input/output module 104 can display various data and information. By way of another example, the touchpad 106 can provide haptic feedback in response to various gestures or other inputs.

In the illustrated example of FIG. 1, the input device 102 is implemented as part of the computing device 100. In this example, the input device 102 is included as part of (e.g., in the same housing as) the input/output module 104 and other components or modules of the computing device 100.

Figure 2:
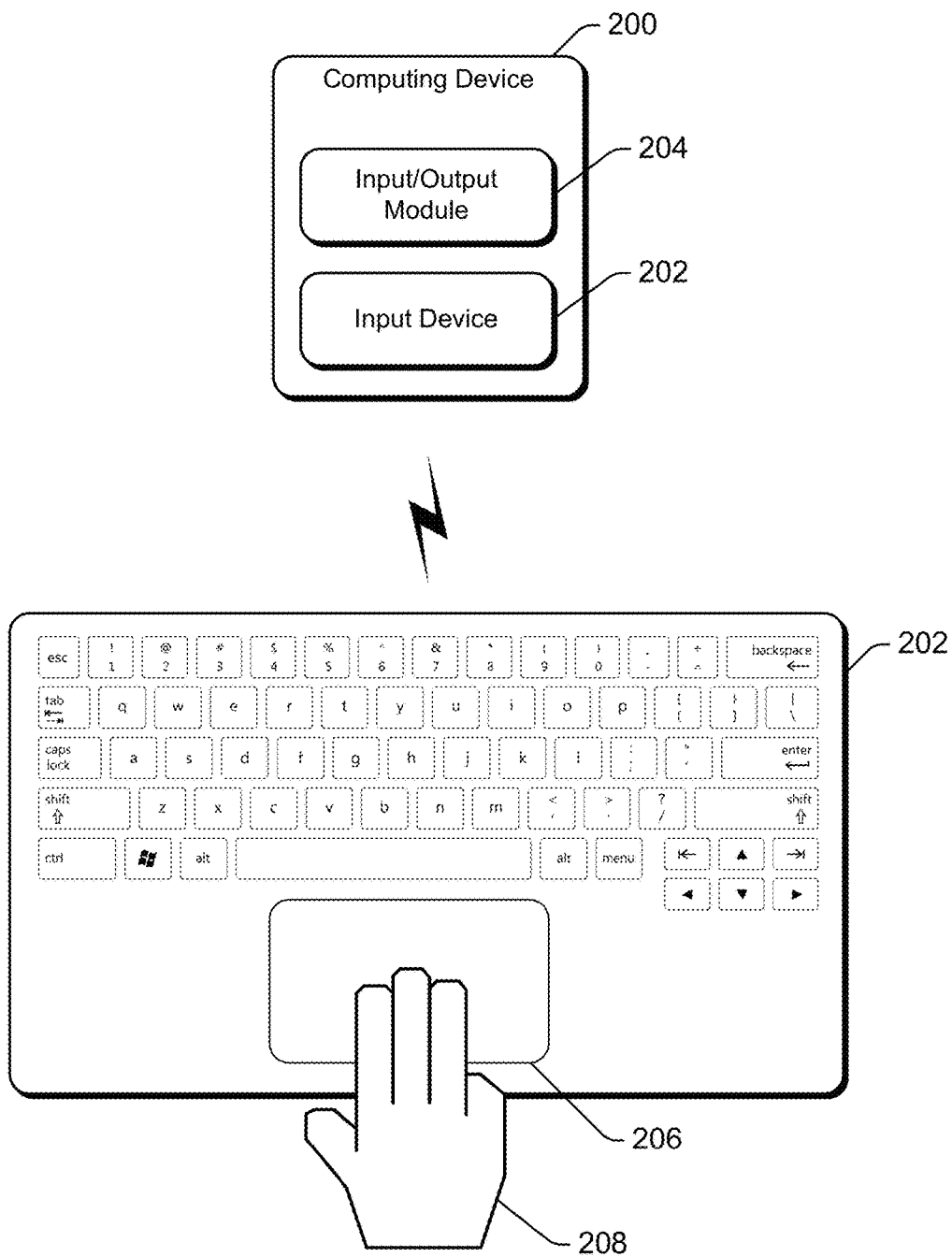
FIG. 2 is a block diagram illustrating an example computing device and input device implementing the multi-finger touchpad gestures in accordance with one or more embodiments.

Alternatively, the computing device and the input device are separate. FIG. 2 is a block diagram illustrating an example computing device 200 and input device 202 implementing the multi-finger touchpad gestures in accordance with one or more embodiments. The input device 202 is communicatively coupled to the computing device 200 via any of a variety of public or proprietary communication mechanisms. For example, the input device 202 may communicate with the computing device 200 via a wireless connection, via a wired connection, via communication contacts of the devices 200 and 202 in contact with one another, and so forth.

The computing device 200 is analogous to the computing device 100 of FIG. 1 (except that the computing device 200 does not include the input device 202) and can be any of a variety of different types analogous to the discussion above regarding computing device 100. The computing device 200 includes an input/output module 204 that is analogous to the input/output module 104 of FIG. 1, although operates with an input device 202 that is separate from the computing device 200, and can implement various different functionality analogous to the discussion above regarding the input/output module 104.

Similarly, the input device 202 is analogous to the input device 102 of FIG. 1 (except that the input device 202 is separate from the computing device 200) and can be implemented using any of a variety of different configurations analogous to the discussion above regarding the input device 102. The input device 202 includes a touchpad 206 that senses three fingers of a hand 208 and that is analogous to the touchpad 106 of FIG. 1 (except that the touchpad 206 is part of an input device 202 that is separate from the computing device 200) and can be implemented using any of a variety of different technologies analogous to the discussion above regarding the touchpad 106.

It should be noted that, although the input/output module 204 is illustrated as being part of the computing device 200, other configurations are contemplated. For example, the input/output module 204 can be implemented as part of the input device 202. By way of another example, the functionality of the input/output module 204 can be separated into two different modules, an input module and an output module, and the input module can be implemented as part of the input device 202 and the output module can be implemented as part of the computing device 200.

An operating system of a computing device (e.g., the computing device 100 or the computing device 200 discussed above) presents a UI on the display device. The UI can include one or more windows in which various data and information can be displayed. Each of multiple different programs running on a computer, including the operating system, can display data or information in one or more different windows. An open window refers to a window that has been created on a computing device, regardless of whether the window can be viewed (e.g., the window may be hidden or minimized, but is still open). A window with which a user can interact (e.g., provide input to) is referred to as the current or active window Typically one window is the current or active window at any given time, although alternatively multiple windows can be the current or active window at any given time.

The operating system UI can also support multiple different desktops concurrently, referred to as virtual desktops. Data files, folders, and optionally programs can be associated with a particular one of the multiple desktops. Any files, folders, and programs associated with a particular desktop are accessible to the user when that particular desktop is a current or active desktop, but are not accessible to the user from other desktops (unless sharing or security settings have been made permitting such accessibility). For example, a user may create two desktops: a work desktop and a personal desktop. Work files and folders are save in the work desktop, and personal files and folders (e.g., family pictures, music, etc.) are saved in the personal desktop.

Virtual desktops are similar to different user accounts on a computing device in that files, folders, and optionally programs are associated with a particular virtual desktop. However, virtual desktops differ from user accounts in that the operating system maintains each virtual desktop as part of a single user account. The user need not log-out from one account and log-in to another account to access the virtual desktops.

Traverse Hierarchical Views Multi-finger Touchpad Gesture

An operating system of a computing device (e.g., the computing device 100 or the computing device 200 discussed above) presents a UI on the display device. The UI has multiple different views or layers that are hierarchical in nature, ranging from a lowest-level view to a highest-level view, with one or more additional views in between. Higher level views display a broader or bigger-picture view than lower level views, while lower level views display more detailed views than higher level views. Lower level views allow the user to more directly interact with a particular window than higher level views, and higher level views provide the user with more of an overview of the entire operating system than lower level views provide. It should be noted that referring to the different views or layers of the UI as hierarchical refers to different ways in which the UI allows windows to be viewed. E.g., sometimes a user may interact with the entire window frame, sometimes the user may interact with a view allowing a window to be selected (e.g., from a set of thumbnails), and so forth. The use of the term "hierarchical" does not indicate any particular rigid state of the system or requirement on the different views of the UI.

In one or more embodiments, the hierarchical views include a base layer or lowest-level view in which a desktop surface is displayed. A next higher layer or view is a window view in which one or more open windows are displayed. The windows can be floating windows, referred to as floating because the windows can be situated anywhere on the device, and can be situated with the location and dimensions they had when they were last the current window. A single full-screen window can also optionally be displayed in the window view. A next higher layer or view is a window selection view in which representations of open windows (e.g., thumbnails) are displayed according to a particular pattern or other criteria, such as displaying the representations of the open windows with uniform sizes. The highest-level layer or view is a virtual desktop in which multiple different desktops can be displayed as well as multiple windows for each desktop. Alternatively, virtual desktops may not be supported, and the highest-level layer may be the window selection view.

Figure 3:
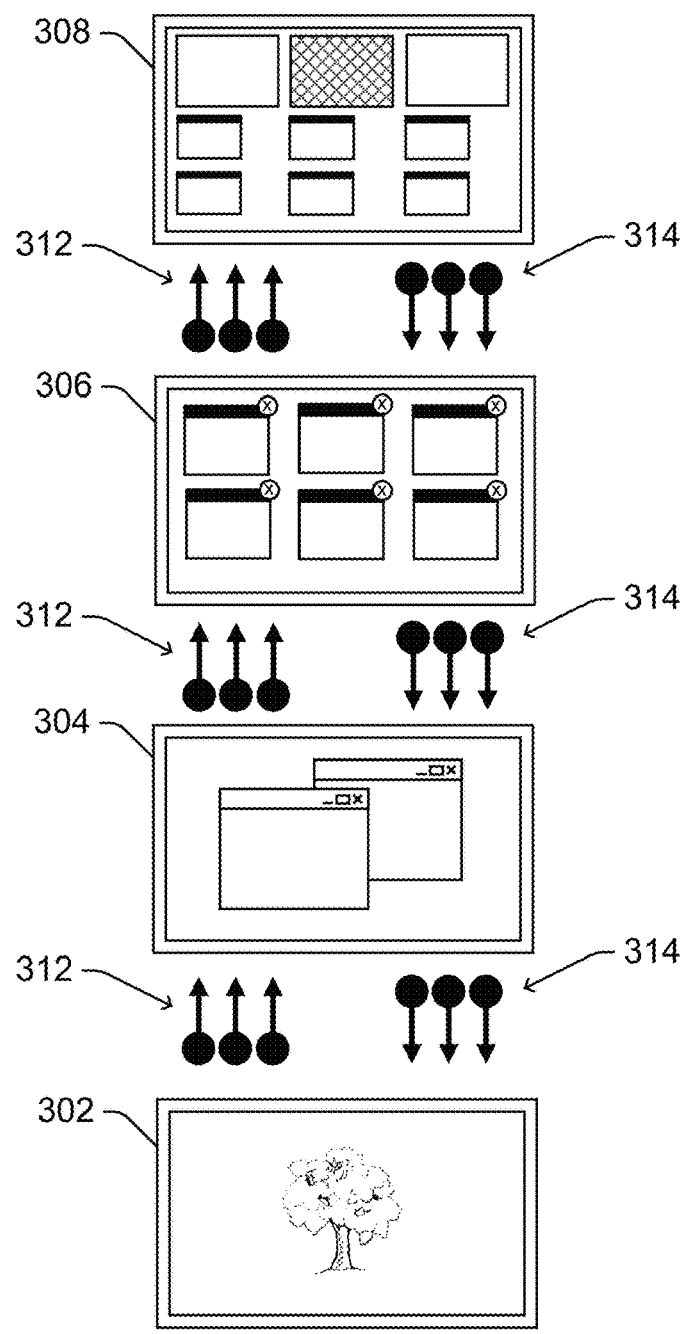
FIG. 3 illustrates an example of traversing hierarchical views with multi-finger touchpad gesture in accordance with one or more embodiments.

FIG. 3 illustrates an example of traversing hierarchical views with multi-finger touchpad gesture in accordance with one or more embodiments. Multiple hierarchical views 300 are illustrated as views 302, 304, 306, and 308. The view 302 is a lowest-level view 302 displaying a desktop surface. The view 304 is a next higher level view displaying windows, of which two are displayed in the illustrated example. The view 306 is a next higher level view displaying a window selection view, in which representations of six different windows are displayed in the illustrated example. The view 308 is a next higher level view (the highest-level view) displaying multiple desktops. In the view 308, three desktops are displayed across the top of the display, one of which is selected (illustrated with cross-hatching). Also in the view 308, six windows corresponding to the selected desktop (e.g., the six windows displayed in the view 306) are displayed below the three desktops.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) causes the operating system UI to change which of the multiple hierarchical views is displayed. Each of the multiple fingers can be situated anywhere that can be sensed by the touchpad—the multiple fingers need not be within any particular distance of one another, need not be arranged in a straight line, or have other placement criteria. Movement in one direction (e.g., up or to the right) results in displaying the next higher layer view. Movement in approximately (within a threshold number of degrees of, such as 10 degrees) the opposite direction (e.g., down or to the left) results in displaying the next lower layer view. Thus, the user can traverse through the hierarchical views, switching to higher level views or lower level views, switching back and forth between different level views, and so forth as desired.

The multi-finger touchpad gesture of three fingers moving up on the touchpad is shown as gesture 312, and results in displaying the next higher level view. Similarly, the multi-finger touchpad gesture of three fingers moving down on the touchpad is shown as gesture 314, and results in displaying the next lower level view.

After the multi-finger touchpad gesture is input and the multiple fingers are no longer sensed by the touchpad, the operating system continues to display the UI with the current hierarchical view. For example, the user can input a multi-finger touchpad gesture in the up direction to switch from the view 302 to the view 304, lift up his or her fingers, and then input the same multi-finger touchpad gesture in the up direction to switch from the view 304 to the view 306. Alternatively, after lifting up his or her fingers, the user can input the same multi-finger touchpad gesture in the down direction to switch from the view 304 to the view 302.

After the multi-finger touchpad gesture is input and the multiple fingers are no longer sensed by the touchpad, different gestures or inputs can also be made. For example, when the view 306 is displayed, the user can move a cursor around the display to select one of the displayed windows by moving a single finger on the touchpad. By way of another example, when the view 308 is displayed, the user can move a cursor around the display to select one of the displayed desktops or windows by moving a single finger on the touchpad.

It should be noted that the hierarchical view to which the user interface displays in response to the multi-finger touchpad gesture is dependent on the current hierarchical view. For example, if the user is currently interacting with windows in the window view 304, then a multi-finger touchpad gesture in one direction causes the window selection view 306 to be displayed, and a multi-finger touchpad gesture in the opposite direction causes the desktop view 302 to be displayed.

Figure 4:
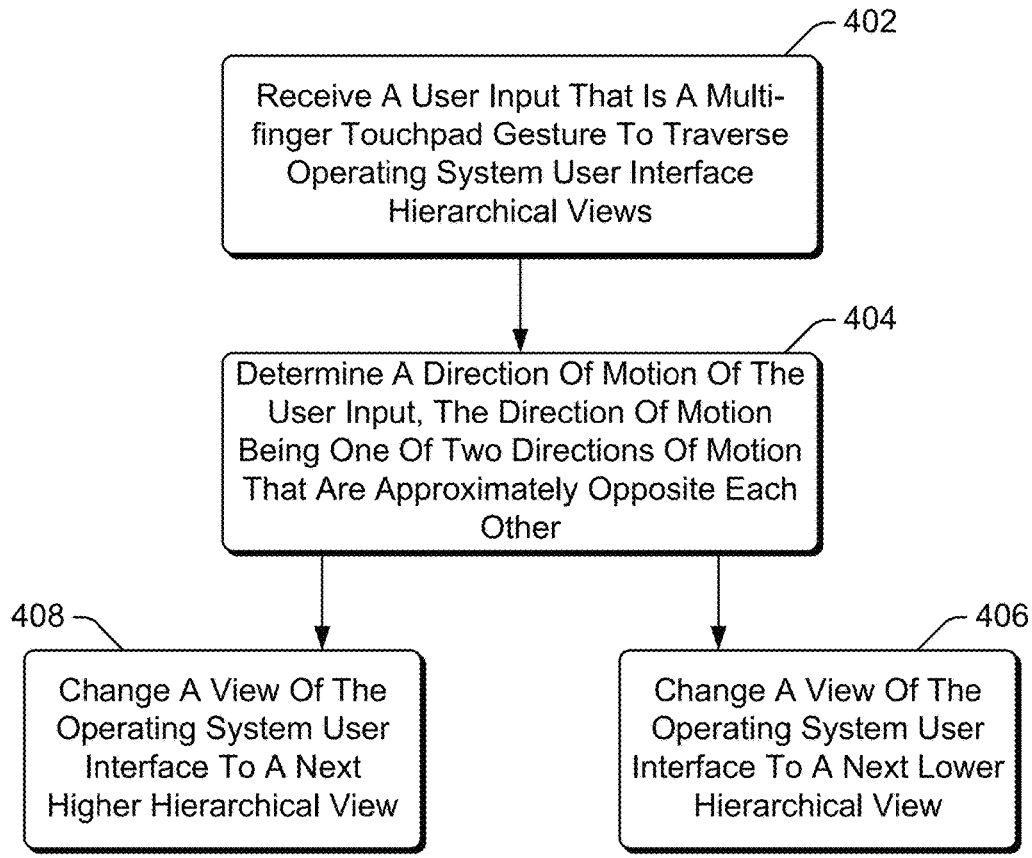
FIG. 4 is a flowchart illustrating an example process for traversing hierarchical views with multi-finger touchpad gestures in accordance with one or more embodiments.

FIG. 4 is a flowchart illustrating an example process 400 for traversing hierarchical views with multi-finger touchpad gestures in accordance with one or more embodiments. Process 400 can be implemented in software, firmware, hardware, or combinations thereof. Process 400 is shown as a set of acts and is not limited to the order shown for performing the operations of the various acts. Process 400 is an example process for traversing hierarchical views with multi-finger touchpad gestures; additional discussions of traversing hierarchical views with multi-finger touchpad gestures are included herein with reference to different figures.

In process 400, a user input that is a multi-finger touchpad gesture to traverse operating system UI hierarchical view is received (act 402). The user input is two or more fingers at the start of the gesture, and can remain the same number of fingers or the number of fingers can change during the gesture as discussed above.

In response to the multi-finger touchpad gesture to traverse operating system UI hierarchical view being input, a determination is made of a direction of motion of the user input (act 404). The direction of motion is one of two directions of motion, each being approximately (e.g., within a threshold number of degrees of) the opposite of the other. For example, the two directions may be up and down, left and right, and so forth.

In response to the user input being in one of the two directions (e.g., down), the operating system UI is changed to display a next lower level hierarchical view (act 406). And, in response to the user input being in the other of the two directions (e.g., up), the operating system UI is changed to display a next higher level hierarchical view (act 408).

The traversing hierarchical views with multi-finger touchpad gesture improves usability of a computing device by advantageously providing an easy, user-friendly input mechanism for the user to switch between hierarchical views of an operating system UI. The user can traverse through the higher level views and the lower level views using the multi-finger touchpad gesture, and advantageously need not enter any particular key sequence on a keyboard, advantageously need not individually select and minimize or restore windows, and so forth.

Switch Between Recent Windows Multi-finger Touchpad Gesture

The operating system of a computing device (e.g., the computing device 100 or the computing device 200 discussed above) presents a UI on the display device as discussed above. One view of this UI is a window view in which one or more windows are displayed, one of which the user can interact with. Each window in this window view can be a floating window or a full-screen window, although not all windows may be displayed concurrently. If displayed as a full-screen window, the view may also be referred to as full-screen view (due to the window taking up the entire screen).

A multi-finger touchpad gesture allows the user to switch between recent windows, which are the current window and a most recently used previous window. The most recently used previous window is the window that was most recently the current window (prior in time to the current window becoming the current window). Each time the multi-finger touchpad gesture is input, the operating system switches the current window and the most recently used previous window, resulting in the current window becoming the most recently used previous window, and the most recently used previous window becoming the current window.

Figure 5:
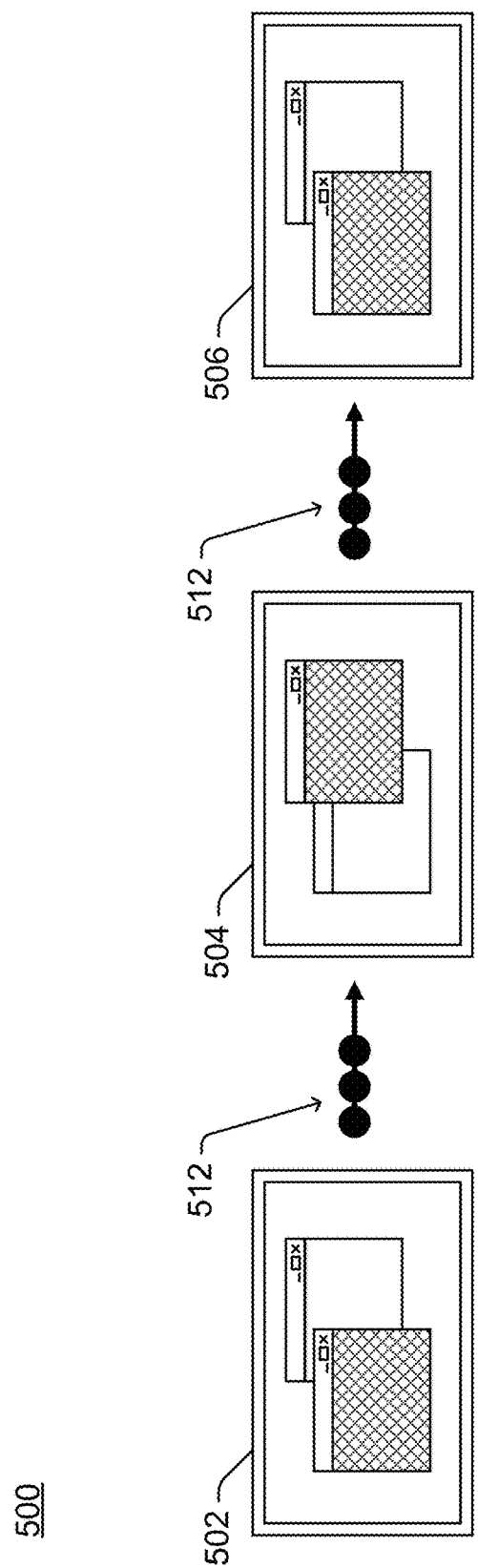
FIG. 5 illustrates an example of switching between recent windows with a multi-finger touchpad gesture in accordance with one or more embodiments.

FIG. 5 illustrates an example of switching between recent windows with a multi-finger touchpad gesture in accordance with one or more embodiments. A progression 500 of UI views are illustrated, including a view 502, a view 504, and a view 506. Two floating windows are shown in each of the views 502, 504, and 506. In each of the views 502, 504, and 506, the window shown with cross-hatching is the current window, and the window shown without cross-hatching is the most recently used previous window.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) causes the operating system UI to switch between recent windows. Each of the multiple fingers can be situated anywhere that can be sensed by the touchpad—the multiple fingers need not be within any particular distance of one another, need not be arranged in a straight line, or have other placement criteria. Movement in one direction (e.g., right, left, up, down) results in switching the current window and the most recently used previous window. The multi-finger touchpad gesture of three fingers moving right on the touchpad is shown as gesture 512, and results in switching the current window and the most recently used previous window.

As illustrated in the progression 500, while the view 502 displayed, the multi-finger touchpad gesture 512 is received, causing the current window and the most recently used previous window to switch, resulting in the view 504 being displayed. As illustrated, the current window in the view 504 was the most recently used previous window in the view 502. While the view 504 displayed, the multi-finger touchpad gesture 512 is again received, causing the current window and the most recently used previous window to switch, resulting in the view 506 being displayed. As illustrated, the current window in the view 506 was the most recently used previous window in the view 504. Thus, by repeatedly inputting the multi-finger touchpad gesture 512, the user can repeatedly switch between the current window and the most recently used previous window.

After the multi-finger touchpad gesture is input and the multiple fingers are no longer sensed by the touchpad, different gestures or inputs can also be made. For example, the user can move a cursor around the display using the touchpad, the user can provide inputs to the current window, and so forth.

It should be noted that although two windows are illustrated in FIG. 5, the switching between recent windows with a multi-finger touchpad gesture operates the same regardless of the number of open windows. The switching is between the current and most recently used previous windows—the switching ignores other windows.

It should also be noted that the current window can change over time in response to various user inputs, and thus the current window and the most recently used previous window change over time. Therefore, the two windows that are switched between in response to the multi-finger touchpad gesture varies at different times, and is not reliant on any particular static ordering of windows (e.g., an order in which windows are opened, an order in which programs are run, and so forth).

Figure 6:
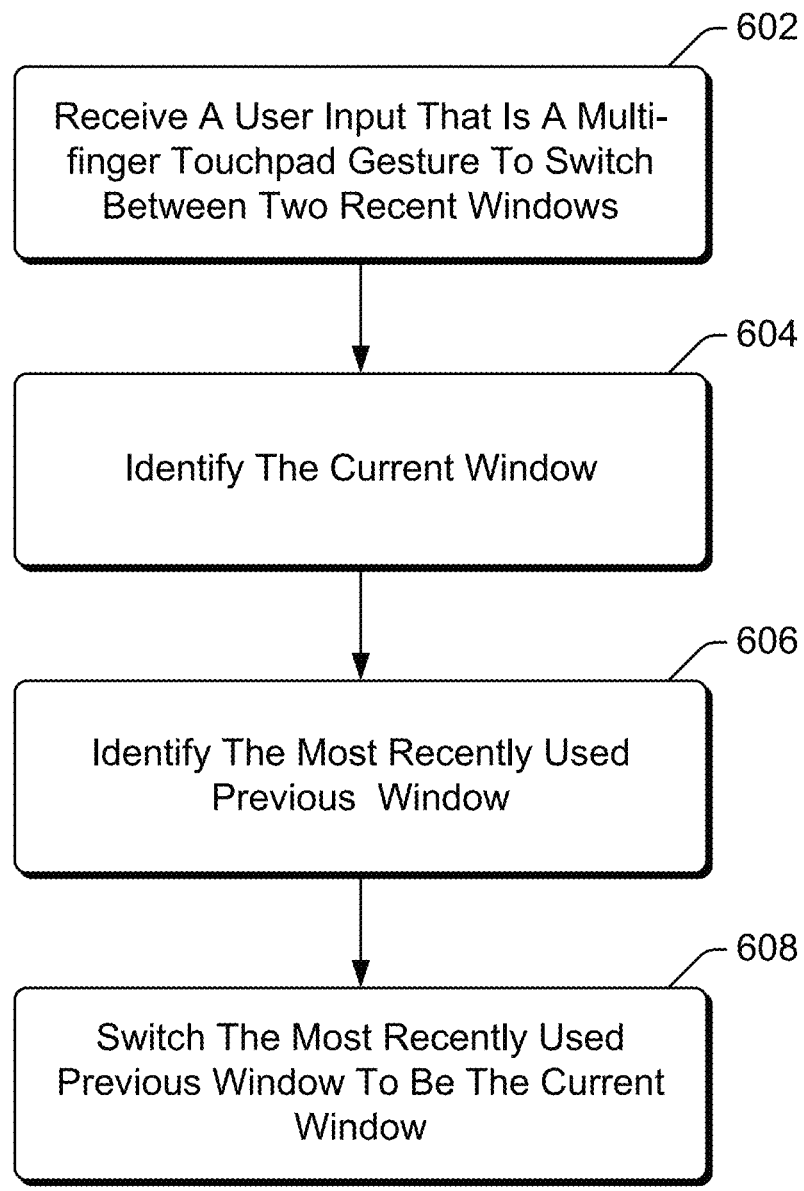
FIG. 6 is a flowchart illustrating an example process for switching between recent windows with a multi-finger touchpad gesture in accordance with one or more embodiments.

FIG. 6 is a flowchart illustrating an example process 600 for switching between recent windows with a multi-finger touchpad gesture in accordance with one or more embodiments. Process 600 can be implemented in software, firmware, hardware, or combinations thereof. Process 600 is shown as a set of acts and is not limited to the order shown for performing the operations of the various acts. Process 600 is an example process for switching between recent windows with a multi-finger touchpad gesture; additional discussions of switching between recent windows with a multi-finger touchpad gesture are included herein with reference to different figures.

In process 600, a user input that is a multi-finger touchpad gesture to switch between two recent windows is received (act 602). The user input is two or more fingers at the start of the gesture, and can remain the same number of fingers or the number of fingers can change during the gesture as discussed above.

In response to the multi-finger touchpad gesture being input, a current window is identified (act 604) and a most recently used previous window is identified (act 606). These windows can be identified in various manners, such as via a record maintained by the operating system. This record can take various forms, such as a list or other indication of the history of windows used on the computing device and an order in which those windows were most recently the current window (e.g., from most recently the current window to least recently the current window).

In response to the user input, and the identification of the current and most recently used previous windows, the operating system switches the most recently used previous window to be the current window (act 608). As part of this switching, the current window is also switched to be the most recently used previous windows Thus, in response to the multi-finger touchpad gesture, the current and most recently used previous windows are switched. This switching is done regardless of whether the windows are floating windows or full-screen windows, regardless of various characteristics of the windows (e.g., the locations of windows, the size of windows, how many windows are open, etc.), and so forth.

The switching between recent windows with multi-finger touchpad gestures improves usability of a computing device by advantageously providing an easy, user-friendly input mechanism for the user to switch between two recently used windows. The user switch between recently used windows using the multi-finger touchpad gestures and advantageously need not be concerned with precision of the cursor in selecting a particular window, advantageously need not be concerned with window characteristics (e.g., whether windows are floating or full screen, the locations or sizes of windows, etc.), and so forth.

Traverse Back Stack of Windows Multi-finger Touchpad Gesture

The operating system of a computing device (e.g., the computing device 100 or the computing device 200 discussed above) presents a UI on the display device as discussed above. One view of this UI is a window view in which one or more windows are displayed (including floating windows or a full-screen window), one of which the user can interact with. The operating system maintains a list or other indication of the history of windows used on the computing device and an order in which those windows were most recently the current window (e.g., from most recently the current window to least recently the current window). This list or other indication, also referred to as a back stack, is essentially a timeline of most recently used windows (the most recently current windows) in the order in which the windows were most recently the current window.

Figure 7:
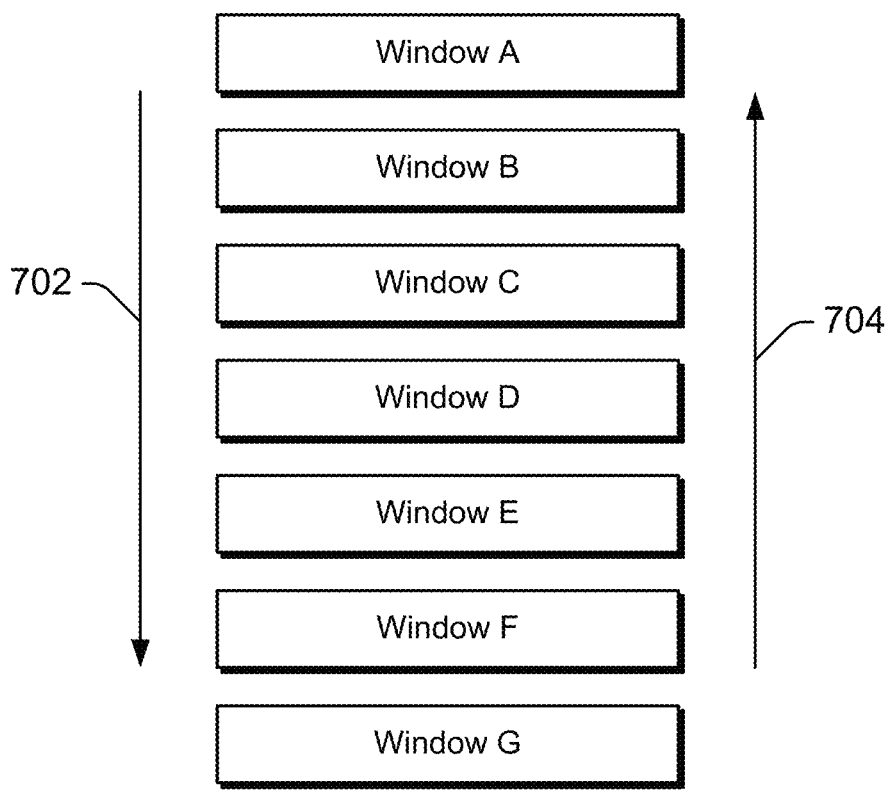
FIG. 7 illustrates an example back stack of windows in accordance with one or more embodiments.

FIG. 7 illustrates an example back stack 700 of windows in accordance with one or more embodiments. The back stack 700 includes seven windows, identified as Window A, Window B, Window C, Window D, Window E, Window F, and Window G. Window A is at the top of the back stack 700 and is the current window. Window G is at the bottom of the back stack 700 and is the least recently used window (the window that was least recently the current window). Moving through the back stack 700 in the direction of arrow 702 is moving to windows that were less recently the current window. For example, from Window D, Window E is the next less recently used window in the back stack 700. Similarly, moving through the back stack 700 in the direction of arrow 704 is moving to windows that were more recently the current window. For example, from Window D, Window C is the next more recently used window in the back stack 700.

Figure 8:
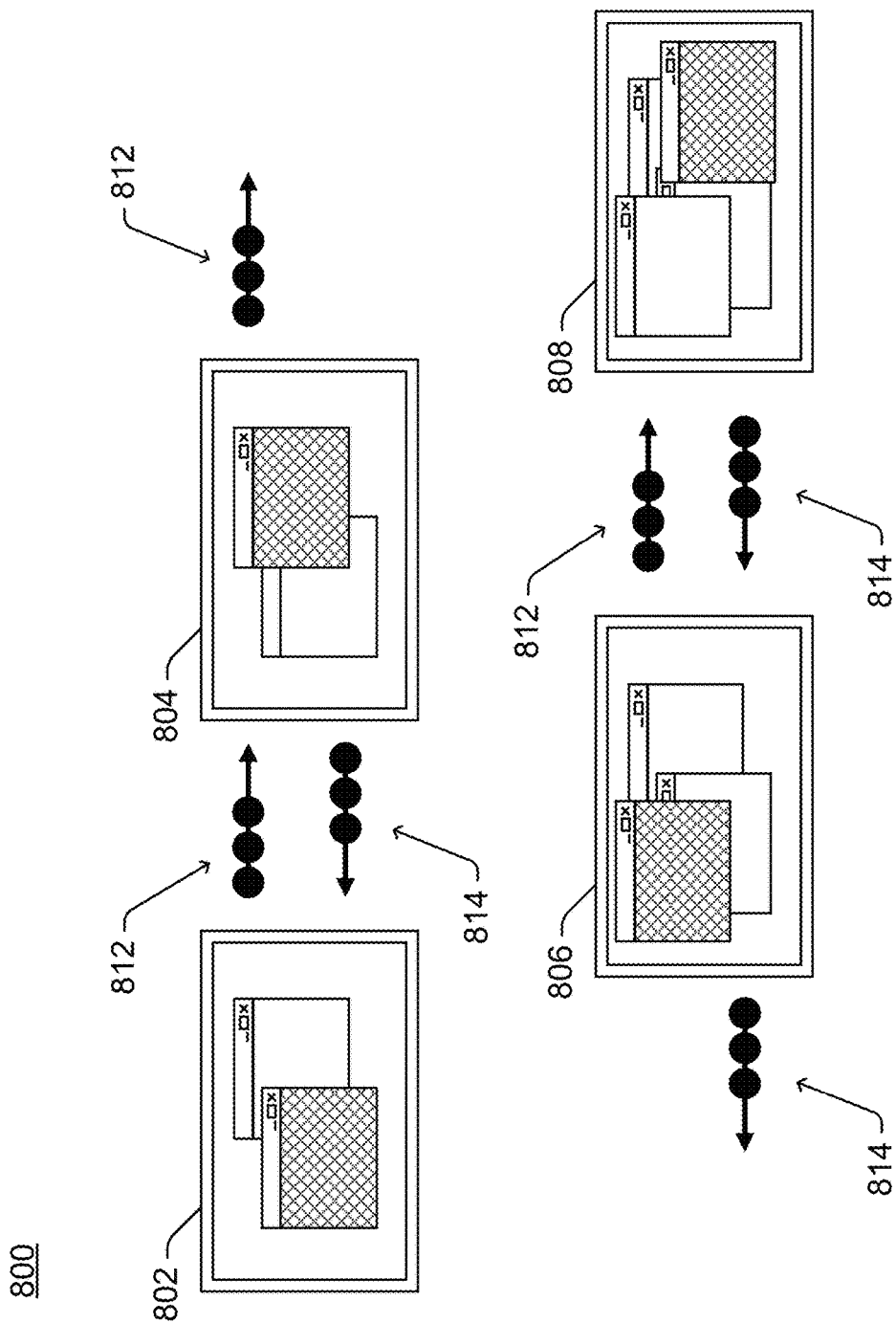
FIG. 8 illustrates an example of traversing the back stack of windows with a multi-finger touchpad gesture in accordance with one or more embodiments.

A multi-finger touchpad gesture allows the user to traverse the back stack, changing which window is the current window. FIG. 8 illustrates an example of traversing the back stack of windows with a multi-finger touchpad gesture in accordance with one or more embodiments. A progression 800 of UI views are illustrated, including a view 802, a view 804, a view 806, and a view 808. Multiple floating windows are shown in each of the views 802, 804, 806, and 808. In each of the views 802, 804, 806, and 808 the window shown with cross-hatching is the current window, and any window shown without cross-hatching is not the current window.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) causes the operating system UI to change which of the windows in the back stack is the current window. Each of the multiple fingers can be situated anywhere that can be sensed by the touchpad—the multiple fingers need not be within any particular distance of one another, need not be arranged in a straight line, or have other placement criteria. Movement in one direction (e.g., right or up) results in making a next less recently used window in the back stack the current window. Movement in approximately (within a threshold number of degrees of, such as 10 degrees) the opposite direction (e.g., down or to the left) results in making the next more recently used window in the back stack the current window. Thus, the user can traverse through the windows in the back stack, switching to more recently or less recently used windows, switching back and forth between windows, and so forth as desired.

The multi-finger touchpad gesture of three fingers moving right on the touchpad is shown as gesture 812, and results in making a next less recently used window in the back stack the current window. Similarly, the multi-finger touchpad gesture of three fingers moving left on the touchpad is shown as gesture 814, and results in making a next more recently used window in the back stack the current window.

In response to the multi-finger touchpad gesture being input, the next most recently used window in the back stack becomes the current window. For example, the cross-hatched window in view 802 can be Window A of back stack 700 of FIG. 7. At view 802, in response to the gesture 812 the next less recently used window in the back stack 700, Window B, becomes the current window in view 804. At view 804, in response to the gesture 812 the next less recently used window in the back stack 700, Window C, becomes the current window in view 806. At view 806, in response to the gesture 812 the next less recently used window in the back stack 700, Window D, becomes the current window in view 808. Similarly, at view 808, in response to the gesture 814 the next more recently used window in the back stack 700, Window C, becomes the current window in view 806. At view 806, in response to the gesture 814 the next more recently used window in the back stack 700, Window B, becomes the current window in view 804. At view 804, in response to the gesture 814 the next more recently used window in the back stack 700, Window A, becomes the current window in view 802.

The back stack of windows changes over time, being updated to reflect usage of the various windows by the user. It should be noted that with the multi-finger touchpad gesture that allows the user to traverse the back stack, a delay is imposed (e.g., a threshold amount of time, such as 5 seconds) before updating the back stack of windows. This delay allows the ordering of the back stack of windows to be maintained rather than immediately updating the back stack to reflect the new current window. For example, at view 802, in response to the gesture 812 the next less recently used window in the back stack 700, Window B, becomes the current window in view 804. However, the back stack is not updated to reflect that Window B is the current window (e.g., is at the top of the back stack 700) until after a threshold amount of time elapses. This allows the user to traverse through the back stack rather than just switching between two recent windows (the two windows that were most recently the current window).

It should be noted that although various numbers of windows are illustrated in FIG. 7, with different numbers of windows being displayed in each view, the traversing the back stack of windows with a multi-finger touchpad gesture operates the same regardless of the number of open windows. Furthermore, if a window is minimized when the window becomes the current window, the window is restored to its previous size and location (prior to being minimized) in response to the multi-finger touchpad gesture.

It should also be noted that the current window can change over time in response to various user inputs, and thus the back stack of windows can change over time. Therefore, the order of windows in the back stack that are traversed through in response to the multi-finger touchpad gesture varies at different times, and is not reliant on any particular static ordering of windows (e.g., an order in which windows are opened, an order in which programs are run, and so forth).

Figure 9:
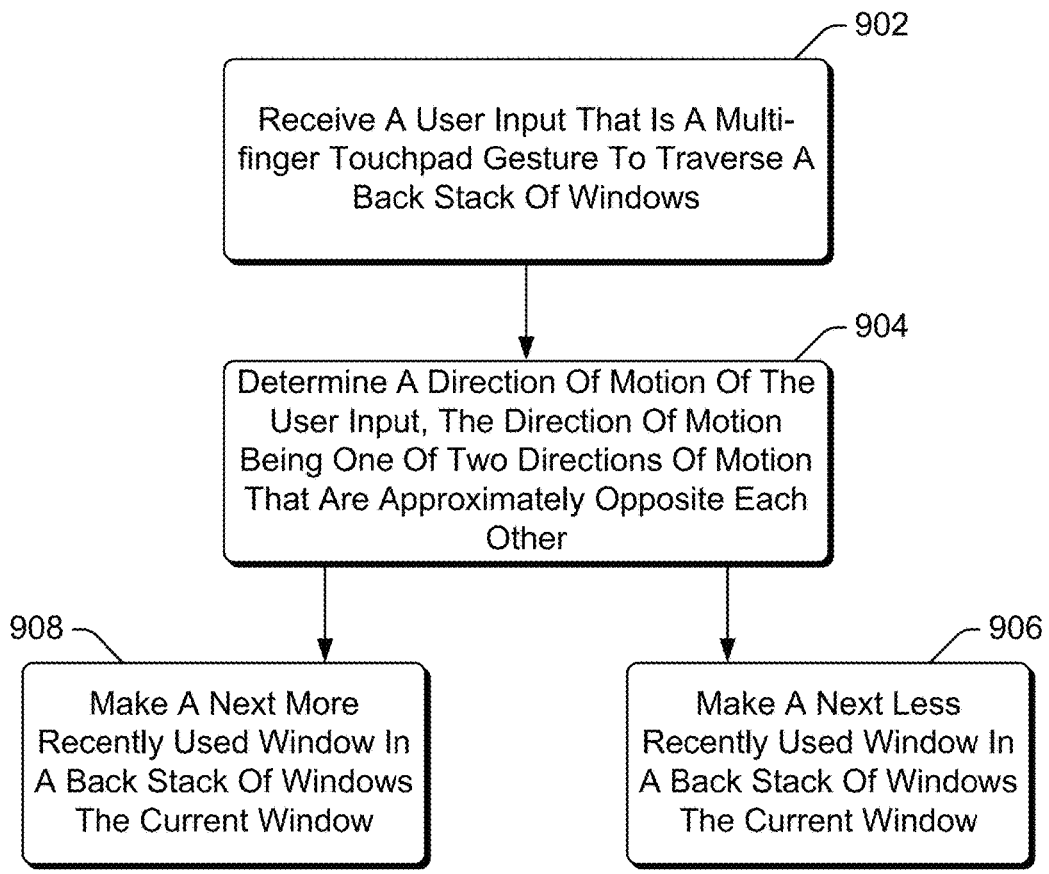
FIG. 9 is a flowchart illustrating an example process for traversing a back stack of windows with multi-finger touchpad gestures in accordance with one or more embodiments.

FIG. 9 is a flowchart illustrating an example process 900 for traversing a back stack of windows with multi-finger touchpad gestures in accordance with one or more embodiments. Process 900 can be implemented in software, firmware, hardware, or combinations thereof. Process 900 is shown as a set of acts and is not limited to the order shown for performing the operations of the various acts. Process 900 is an example process for traversing a back stack of windows with multi-finger touchpad gestures; additional discussions of traversing a back stack of windows with multi-finger touchpad gestures are included herein with reference to different figures.

In process 900, a user input that is a multi-finger touchpad gesture to traverse a back stack of windows is received (act 902). The user input is two or more fingers at the start of the gesture, and can remain the same number of fingers or the number of fingers can change during the gesture as discussed above.

In response to the multi-finger touchpad gesture to traverse a back stack of windows being input, a determination is made of a direction of motion of the user input (act 904). The direction of motion is one of two directions of motion, each being approximately (e.g., within a threshold number of degrees of) the opposite of the other. For example, the two directions may be left and right, up and down, and so forth.

In response to the user input being in one of the two directions (e.g., right), a next less recently used window in the back stack of windows is made the current window (act 906). And, in response to the user input being in the other of the two directions (e.g., left), a next more recently used window in the back stack of windows is made the current window (act 908).

The traversing a back stack of windows with multi-finger touchpad gestures improves usability of a computing device by advantageously providing an easy, user-friendly input mechanism for the user to switch between windows. The user can traverse through the back stack of windows using the multi-finger touchpad gesture, and advantageously need not be concerned with precision of the cursor in selecting a particular window, can advantageously traverse through windows in the order in which they were most recently the current window, and so forth.

Scrubbing Window Selection Multi-finger Touchpad Gesture

The operating system of a computing device (e.g., the computing device 100 or the computing device 200 discussed above) presents a UI on the display device as discussed above. One view of this UI is a window selection view in which representations of open windows (e.g., thumbnails) are displayed according to a particular pattern or other criteria, such as displaying the representations of the open windows with uniform sizes. A multi-finger touchpad gesture is a single continuous gesture that allows the user to switch from a current view to the window selection view and then select a window from within the window selection view. The current view can be any of the hierarchical views of the operating system UI discussed above.

Figure 10:
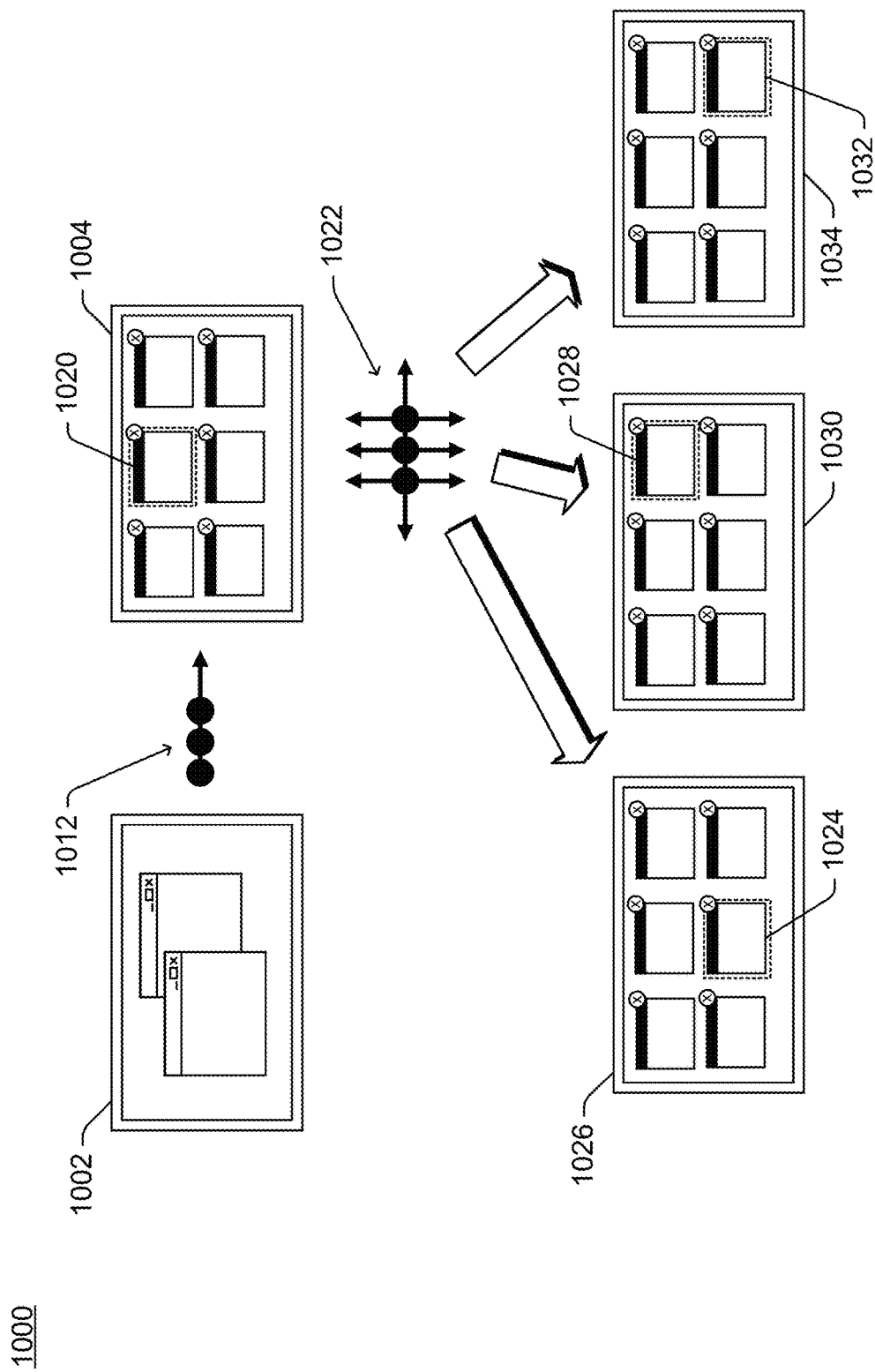
FIG. 10 illustrates an example of selecting a window with a multi-finger touchpad gesture in accordance with one or more embodiments.

FIG. 10 illustrates an example 1000 of selecting a window with a multi-finger touchpad gesture in accordance with one or more embodiments. A current view 1002 is illustrated as a window view with multiple floating windows, although the current view 1002 can be any of the hierarchical views of the operating system UI.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) causes the operating system UI to switch to the window selection view 1004. Each of the multiple fingers can be situated anywhere that can be sensed by the touchpad—the multiple fingers need not be within any particular distance of one another, need not be arranged in a straight line, or have other placement criteria. Movement in one direction (e.g., right, left, up, down) results in switching to the window selection view 1004. The multi-finger touchpad gesture of three fingers moving right on the touchpad is shown as gesture 1012, and results in displaying the window selection view 1004.

The window selection view 1004 displays representations of each of multiple open windows on the computing device. The representation of a window can be a thumbnail of the window, the thumbnail displaying various information regarding the window. For example, the thumbnail can be an indication of a program that displays data in the window (e.g., a program name or logo), a reduced-size version of data that was last displayed in the window when the window was last the current window, a select portion of data that was last displayed in the window when the window was last the current window, and so forth.

One of the thumbnails in the window selection view 1004 is highlighted, illustrated as a dashed line in the window selection view 1004, shown as thumbnail 1020. A thumbnail can be highlighted in any of a variety of different manners that allows the thumbnail to be distinguished from other thumbnails. For example, a thumbnail can be highlighted by surrounding the thumbnail with a border, changing the color of the thumbnail (or the colors of the non-highlighted thumbnails), changing the brightness of the thumbnail (or the brightness of the non-highlighted thumbnails), changing the size of the thumbnail (or the sizes of the non-highlighted thumbnails), and so forth.

With the window selection view 1004 being displayed, the user can move his or her fingers in any direction to change which thumbnail is highlighted without lifting his or her fingers so that they are no longer sensed by the touchpad after switching to the window selection view 1004. This movement is shown as directional movement 1022, and is referred to as scrubbing (the user moves his or her fingers around but keeps them positioned so they remain sensed by the touchpad (e.g., the user keeps his or her fingers on the touchpad)). For example, if the user moves his or her fingers down, the highlighted thumbnail becomes thumbnail 1024, which is below the thumbnail 1020, as illustrated in the window selection view 1026. By way of another example, if the user moves his or her fingers right, the highlighted thumbnail becomes thumbnail 1028, which is to the right of the thumbnail 1020, as illustrated in the window selection view 1030. By way of yet another example, if the user moves his or her fingers down and right, the highlighted thumbnail becomes thumbnail 1032, which is to the right of and below the thumbnail 1020, as illustrated in the window selection view 1032. Thus, the movement of the user's fingers to switch to the window selection view 1004 and then switch to a selected window displayed in the window selection view 1004 is a single continuous gesture. The user is advantageously able to fluidly navigate to the window selection view and then select a window in one motion without lifting his or her fingers so they are no longer sensed by the touchpad.

The one or more fingers used to perform the directional movement 1022 can be the same fingers used to perform the gesture 1012, or alternatively fewer or additional fingers. For example, the gesture 1012 can be three fingers moved to the right along the touchpad. Two of those three fingers can then be lifted off (and no longer sensed by) the touchpad, and the directional movement 1022 can be performed with the remaining one finger.

The user selects one of the thumbnails by lifting his or her fingers away from the touchpad so that the touchpad no longer senses his or her fingers. Selection of the thumbnail is also selection of the window that is represented by the selected thumbnail, and the selected window becomes the current window. It should be noted that the user keeps his or her fingers positioned so that they are sensed by the touchpad (e.g., keeps his or her fingers on the touchpad) after inputting the gesture 1012 and while inputting the directional movement 1022. Lifting his or her fingers from the touchpad serves as the selection of the highlighted thumbnail as discussed above, so the user keeps his or her fingers on the touchpad until the desired thumbnail is highlighted.

Figure 11:
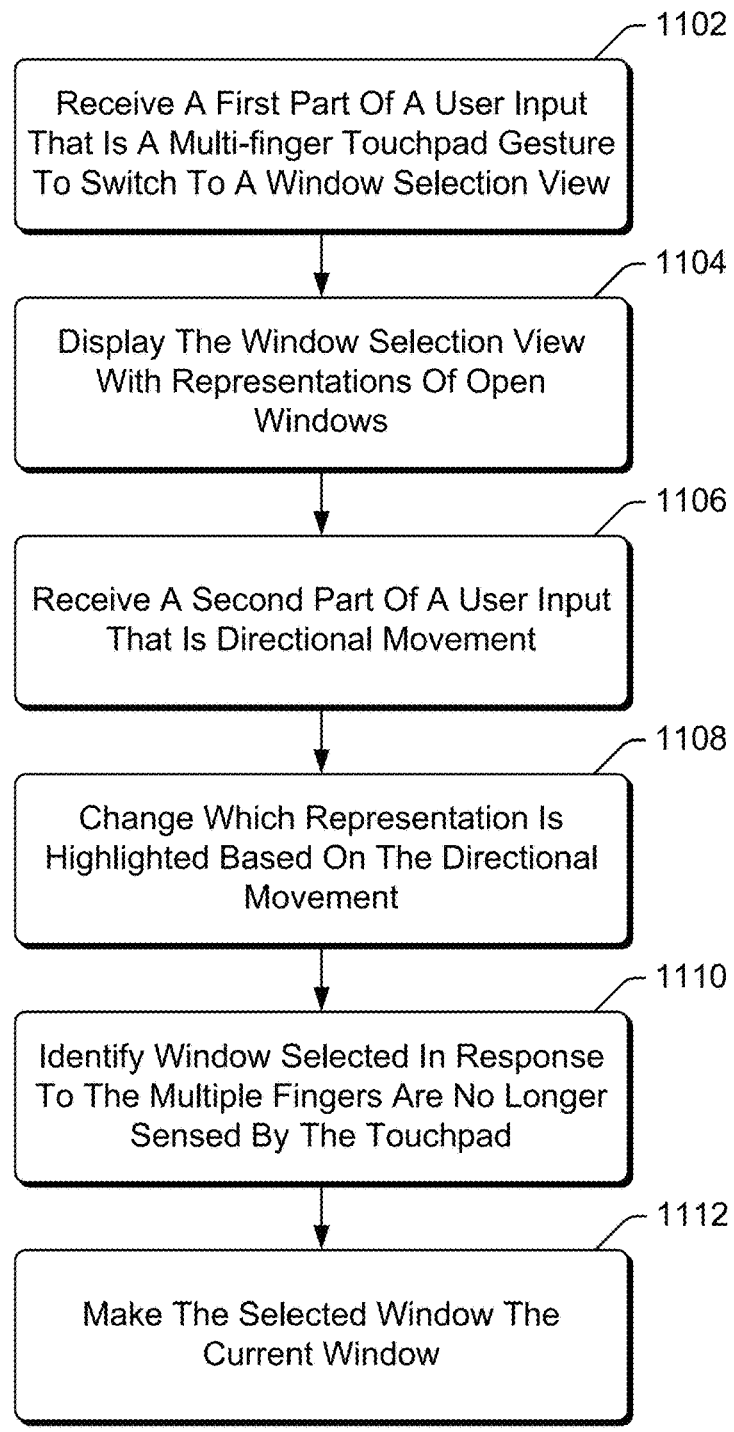
FIG. 11 is a flowchart illustrating an example process for selecting a window with a multi-finger touchpad gesture in accordance with one or more embodiments.

FIG. 11 is a flowchart illustrating an example process 1100 for selecting a window with a multi-finger touchpad gesture in accordance with one or more embodiments. Process 1100 can be implemented in software, firmware, hardware, or combinations thereof. Process 1100 is shown as a set of acts and is not limited to the order shown for performing the operations of the various acts. Process 1100 is an example process for selecting a window with a multi-finger touchpad gesture; additional discussions of selecting a window with a multi-finger touchpad gesture are included herein with reference to different figures.

In process 1100, a first part of a user input that is a multi-finger touchpad gesture to switch to a window selection view is received (act 1102). The first part of the user input is two or more fingers at the start of the gesture, and can remain the same number of fingers or the number of fingers can change during the first part of the user input as discussed above.

In response to the multi-finger touchpad gesture being input, a window selection view is displayed (act 1104). The window selection view displays representations of open windows as discussed above. A second part of the user input that is a directional movement is also received (act 1106). The directional movement part of the user input is sensed movement of the fingers by the touchpad, and can be in any direction as discussed above. Movement of the fingers at least a threshold distance (e.g., 1 centimeter, or 10% of the width or height of the touchpad) in one or more directions causes a different window representation to be highlighted, and which window representation in the window selection view is highlighted is changed based on the directional movement (act 1108). As discussed above, one or more of the user's fingers remains sensed by the touchpad during the first and second parts of the user input—there is no time between the first and second parts of the user input during which one or more of the user's fingers are no longer sensed by the touchpad. The first and second parts of the user input are two parts of a single continuous gesture.

A selected window is identified in response to the multiple fingers no longer being sensed by the touchpad (act 1110). The selected window is the window represented by the highlighted window representation at the time that the multiple fingers (one or more of which were fingers used to provide the multi-finger touchpad gesture) are no longer sensed by the touchpad. The selected window is made the current window (act 1112), and the operating system UI view returns to a view in which the selected window is the current window (e.g., a window view), thus switching to the selected window.

The selecting of a window with a multi-finger touchpad gesture improves usability of a computing device by advantageously providing an easy, user-friendly input mechanism for the user to switch to a window. The selection of a window to switch to is performed with continuous touching and motion by the user, the user advantageously need not be concerned with precision of the cursor in selecting a particular window, advantageously need not be concerned with lifting his or her fingers from the touchpad and clicking on a mouse or similar button, and so forth.

Window Movement Multi-finger Touchpad Gesture

The operating system of a computing device (e.g., the computing device 100 or the computing device 200 discussed above) presents a UI on the display device as discussed above. Various different views of the UI display a current window, and that window can be moved in various manners including being minimized, maximized, snapped to an edge, snapped to a corner, or moved to an arbitrary location on the screen. Snapping a window to an edge refers to having the window resized as appropriate to a particular amount of the display (e.g., half the display) and located adjacent the edge being snapped to. Snapping a window to a corner refers to having the window resized as appropriate to a particular amount of the display (e.g., a quarter of the display) and located with each of two edges of the window adjacent to the edges that create the corner being snapped to. A multi-finger touchpad gesture allows the user to perform any of these movements.

Figure 12:
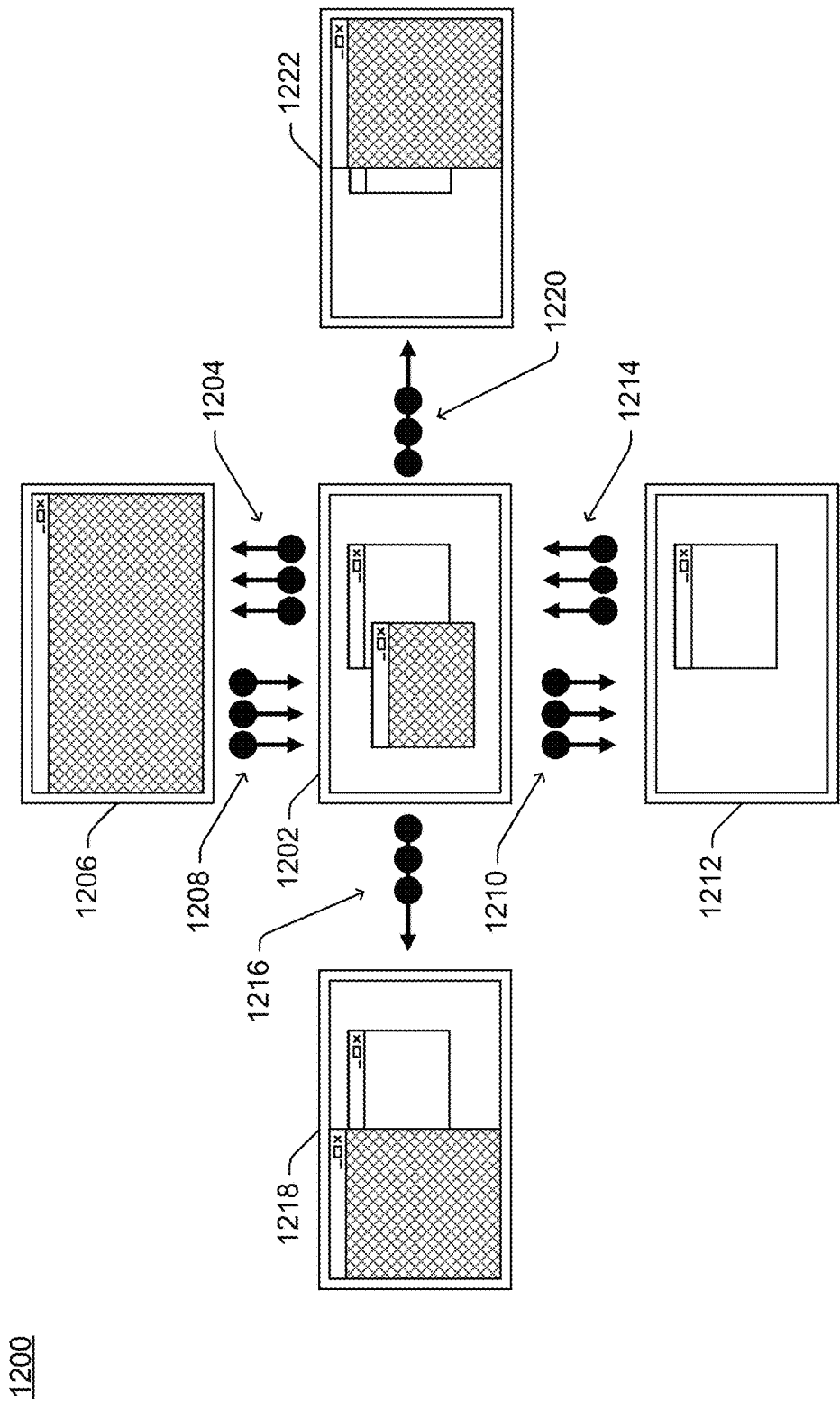
FIG. 12 illustrates an example of moving a window with a multi-finger touchpad gesture in accordance with one or more embodiments.

FIG. 12 illustrates an example 1200 of moving a window with a multi-finger touchpad gesture in accordance with one or more embodiments. A current view 1202 is illustrated as a window view, although the current view 1202 can be any view of the operating system UI that displays a current window. The current window in the view 1202 is illustrated with cross-hatching.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) in a particular pattern causes the operating system UI to move the current window. Each of the multiple fingers can be situated anywhere that can be sensed by the touchpad—the multiple fingers need not be within any particular distance of one another, need not be arranged in a straight line, or have other placement criteria. Movement in a particular direction (e.g., right, left, up, down) results in the current window being moved in that direction.

The multi-finger touchpad gesture of three fingers moving up on the touchpad is shown as gesture 1204, and results in maximizing the current window so the window becomes a full-screen window as illustrated in view 1206. The multi-finger touchpad gesture of three fingers moving down on the touchpad while the window is a full-screen window is shown as gesture 1208, and results in displaying the current window as a floating window as illustrated in view 1202. The multi-finger touchpad gesture of three fingers moving down on the touchpad while the window is a floating window is shown as gesture 1210, and results in minimizing the window so that the window is not displayed as illustrated in view 1212. The multi-finger touchpad gesture of three fingers moving up on the touchpad while the window is minimized is shown as gesture 1214, and results in displaying the current window as a floating window as illustrated in view 1202.

The multi-finger touchpad gesture of three fingers moving left on the touchpad is shown as gesture 1216, and results in snapping the current window to the left-hand side of the display as illustrated in view 1218. The multi-finger touchpad gesture of three fingers moving right on the touchpad is shown as gesture 1220, and results in snapping the current window to the right-hand side of the display as illustrated in view 1222.

It should be noted that the movement of the multiple fingers for the multi-finger touchpad gesture can be a small enough distance (e.g., 1 or 2 centimeters) to allow the user to select different ones of these movements while his or her fingers remain sensed by the touchpad (e.g., without lifting his or her fingers from the touchpad). E.g., the user can move his or her fingers up to maximize the current window, then down to effectively undo the maximizing. The last movement made when the fingers are no longer sensed by the touchpad is the selected movement.

Figure 13:
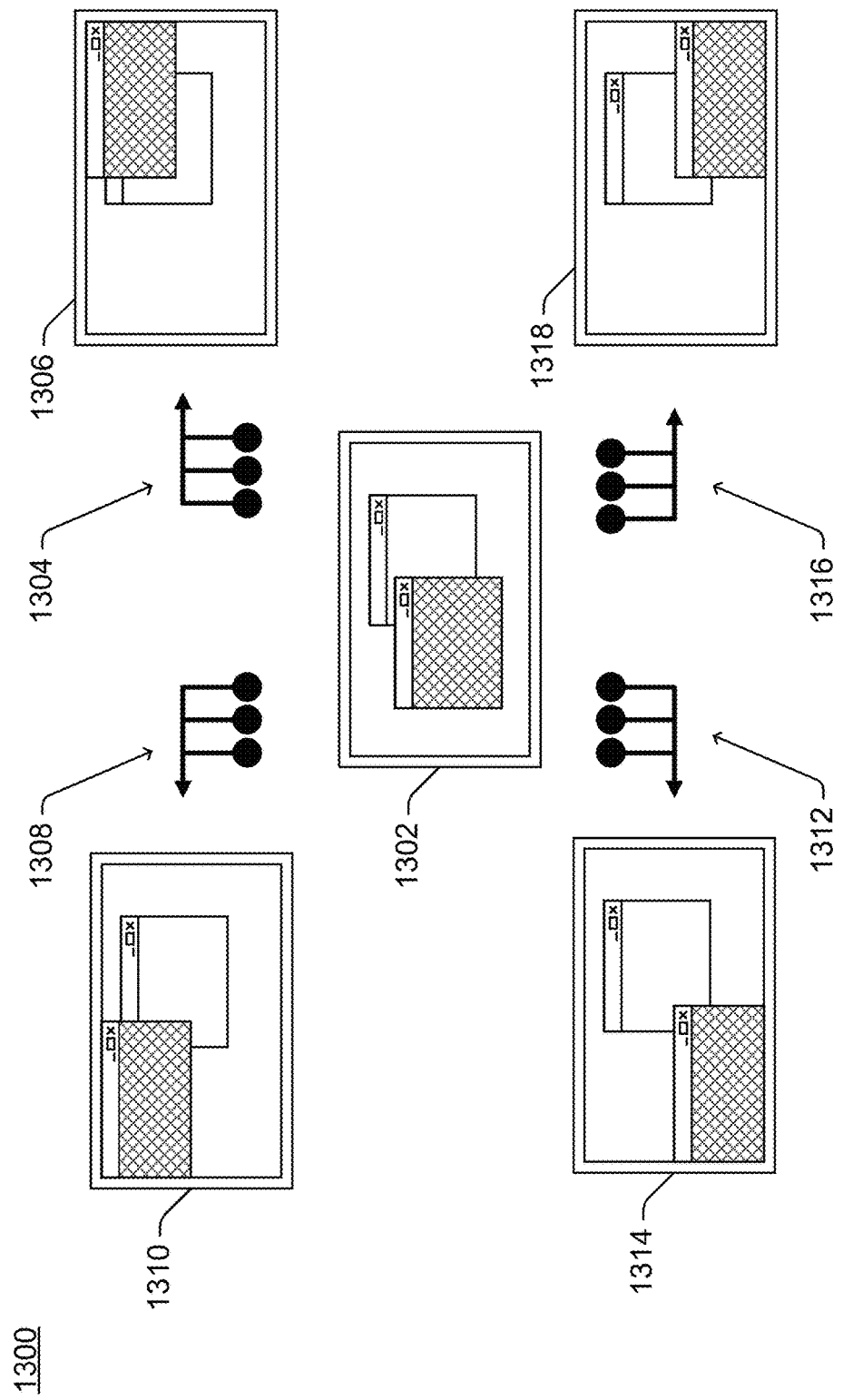
FIG. 13 illustrates another example of moving a window with a multi-finger touchpad gesture in accordance with one or more embodiments.

FIG. 13 illustrates another example 1300 of moving a window with a multi-finger touchpad gesture in accordance with one or more embodiments. A current view 1302 is illustrated as a window view, although the current view 1302 can be any view of the operating system UI that displays a current window. The current window in the view 1300 is illustrated with cross-hatching.

A multi-finger touchpad gesture having a pattern beginning with each of the multiple fingers moving concurrently in approximately (e.g., within a threshold number of degrees of, such as 10 degrees) a straight line for at least a threshold distance (e.g., 2 centimeters, or 10% of the width or height of the touchpad) in a particular pattern causes the operating system UI to move the current window. The particular pattern comprises one direction (e.g., right, left, up, down), followed by a change to a perpendicular direction. For example, up then left, down then right, and so forth. Each of the multiple fingers can be situated anywhere that can be sensed by the touchpad—the multiple fingers need not be within any particular distance of one another, need not be arranged in a straight line, or have other placement criteria.

The pattern of movement causes the operating system to snap the current window to a particular corner. A pattern that is up then right results in snapping the current window to the top right of the display with a size approximately (e.g., within a threshold amount of) one-quarter of the display screen. A pattern that is up then left results in snapping the current window to the top left of the display with a size approximately (e.g., within a threshold amount of) one-quarter of the display screen. A pattern that is down then left results in snapping the current window to the bottom left of the display with a size approximately (e.g., within a threshold amount of) one-quarter of the display screen. A pattern that is down then right results in snapping the current window to the bottom right of the display with a size approximately (e.g., within a threshold amount of) one-quarter of the display screen. Alternatively, other patterns can be used. For example, a pattern that is diagonal (e.g., within a threshold number of degrees of 45 degrees, such as 5 degrees) towards the top right can result in snapping the current window to the top right of the display, a pattern that is diagonal towards the top left can result in snapping the current window to the top left of the display, and so forth.

The multi-finger touchpad gesture of three fingers moving up then right on the touchpad is shown as gesture 1304, and results in snapping the current window to the top right corner of the display as illustrated in view 1306. The multi-finger touchpad gesture of three fingers moving up then left on the touchpad is shown as gesture 1308, and results in snapping the current window to the top left corner of the display as illustrated in view 1310. The multi-finger touchpad gesture of three fingers moving down then left on the touchpad is shown as gesture 1312, and results in snapping the current window to the bottom left corner of the display as illustrated in view 1314. The multi-finger touchpad gesture of three fingers moving down then right on the touchpad is shown as gesture 1316, and results in snapping the current window to the bottom right corner of the display as illustrated in view 1318.

Figure 14:
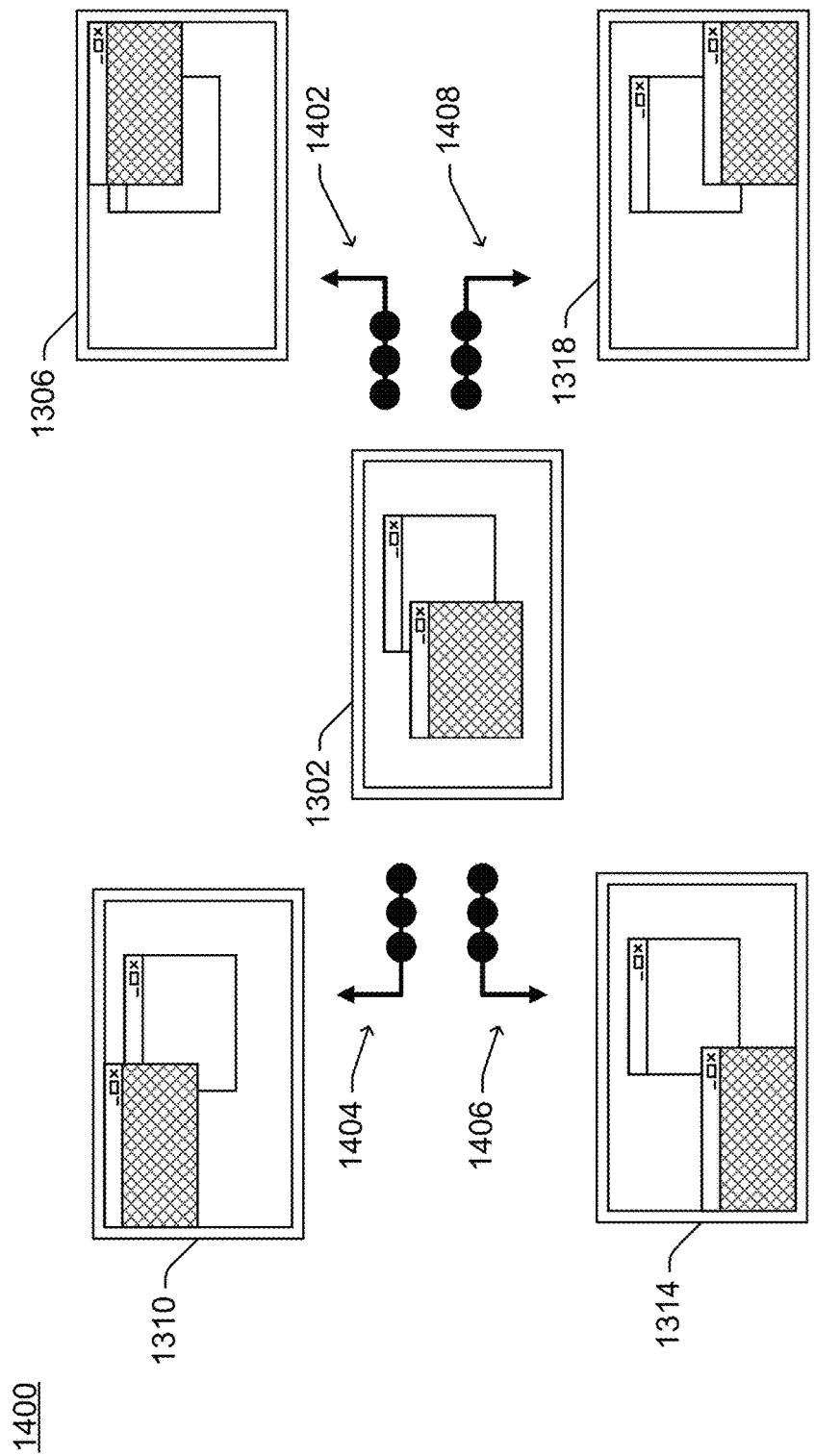
FIG. 14 illustrates another example of moving a window with a multi-finger touchpad gesture in accordance with one or more embodiments.

FIG. 14 illustrates another example 1400 of moving a window with a multi-finger touchpad gesture in accordance with one or more embodiments. The example 1400 of FIG. 14 is similar to the example 1300 of FIG. 13, including the current view 1302, as well as views 1306, 1310, 1314, and 1318. A multi-finger touchpad gesture that is a pattern causes the operating system UI to move the current window in the example 1400, analogous to the example 1300. However, the example 1400 illustrates a different pattern than the example 1300.

The multi-finger touchpad gesture of three fingers moving right then up on the touchpad is shown as gesture 1402, and results in snapping the current window to the top right corner of the display as illustrated in view 1306. The multi-finger touchpad gesture of three fingers moving left then up on the touchpad is shown as gesture 1404, and results in snapping the current window to the top left corner of the display as illustrated in view 1310. The multi-finger touchpad gesture of three fingers moving left then down on the touchpad is shown as gesture 1406, and results in snapping the current window to the bottom left corner of the display as illustrated in view 1314. The multi-finger touchpad gesture of three fingers moving right then down on the touchpad is shown as gesture 1408, and results in snapping the current window to the bottom right corner of the display as illustrated in view 1318.

The examples in FIGS. 12, 13, and 14 illustrate movement including snapping to a corner, snapping to an edge, maximizing, and minimizing Additionally or alternatively, in one or more embodiments the particular pattern of movement for the multi-finger touchpad gesture can be movement in a particular direction (e.g., left, right, up, or down). The multi-finger touchpad gesture causes the current window to "attach" to one or more of the multiple fingers, and once attached the window can be moved freeform around the display by moving the one or more of the multiple fingers. The current window attaching to one or more fingers refers to the current window moving in the same direction as the one or more fingers are moved across the touchpad. The current window maintains its current size, and can be moved anywhere on the display. In response to the one or more fingers to which the current window is attached no longer being sensed by the touchpad, the current window is placed at the location it was moved to at the time the one or more fingers are no longer sensed by the touchpad. While moving the window around freeform, the window can be snapped to an edge or corner, minimized, or maximized. For example, the window can be maximized by moving the window adjacent to the top of the display, the window can be snapped to an edge by moving the window adjacent to the edge, and so forth.

Figure 15:
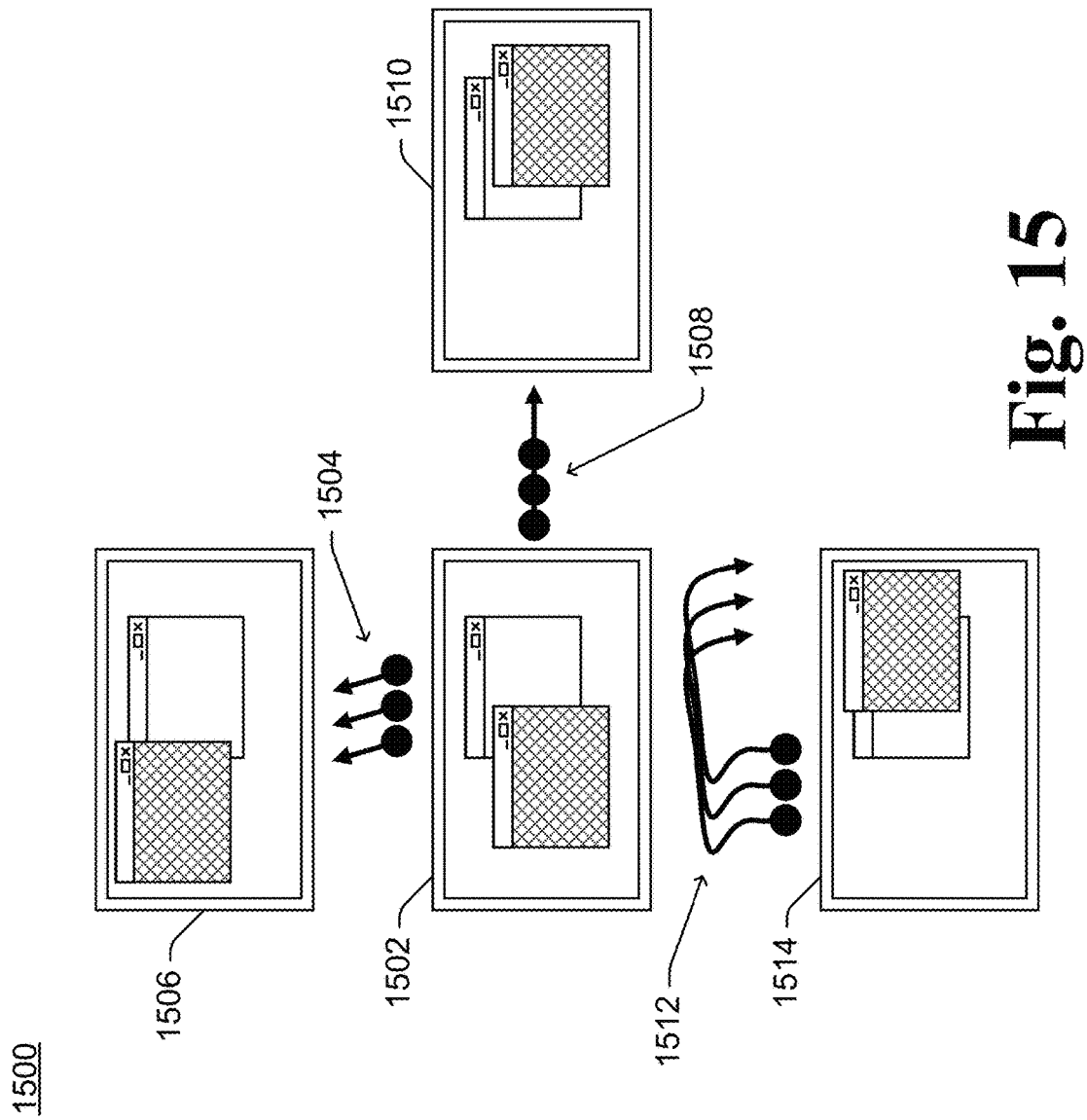
FIG. 15 illustrates an example of freeform moving a window in accordance with one or more embodiments.

FIG. 15 illustrates an example 1500 of freeform moving a window in accordance with one or more embodiments. A current view 1502 is illustrated as a window view, although the current view 1502 can be any view of the operating system UI that displays a current window. The current window in the view 1500 is illustrated with cross-hatching.

A multi-finger touchpad gesture having a pattern that is each of the multiple fingers moving concurrently in approximately (e.g., within a threshold number of degrees of, such as 10 degrees) a straight line for at least a threshold distance (e.g., 2 centimeters, or 10% of the width or height of the touchpad) in a particular pattern causes the operating system UI to attach the current window to one or more of the multiple fingers. The particular pattern comprises one direction (e.g., right, left, up, down). Each of the multiple fingers can be situated anywhere that can be sensed by the touchpad—the multiple fingers need not be within any particular distance of one another, need not be arranged in a straight line, or have other placement criteria. Alternatively, the current window may attach to one or more of the multiple fingers without any movement of the multiple fingers (e.g., simply by having multiple fingers touching the window for at least a threshold amount of time (e.g., 2 or 3 seconds).

Once the window is attached to one or more fingers, movement of the one or more fingers in any direction causes the window to move in that same direction. The window can be moved freeform to any location on the screen. For example, moving the one or more fingers up and to the left on the touchpad, shown as movement 1504 and then lifting the one or more fingers to which the current window is attached so that the one or more fingers are no longer being sensed by the touchpad, results in moving the current window across the display up and to the left, ending at the location as illustrated in view 1506. By way of another example, moving the one or more fingers to the right on the touchpad, shown as movement 1508 and then lifting the one or more fingers to which the current window is attached so that the one or more fingers are no longer being sensed by the touchpad, results in moving the current window across the display to the right, ending at the location as illustrated in view 1510. By way of another example, moving the one or more fingers around in some freeform pattern, shown as movement 1512 and then lifting the one or more fingers to which the current window is attached so that the one or more fingers are no longer being sensed by the touchpad, results in moving the current window around the display in the same freeform pattern, ending at the location as illustrated in view 1514.

Figure 16:
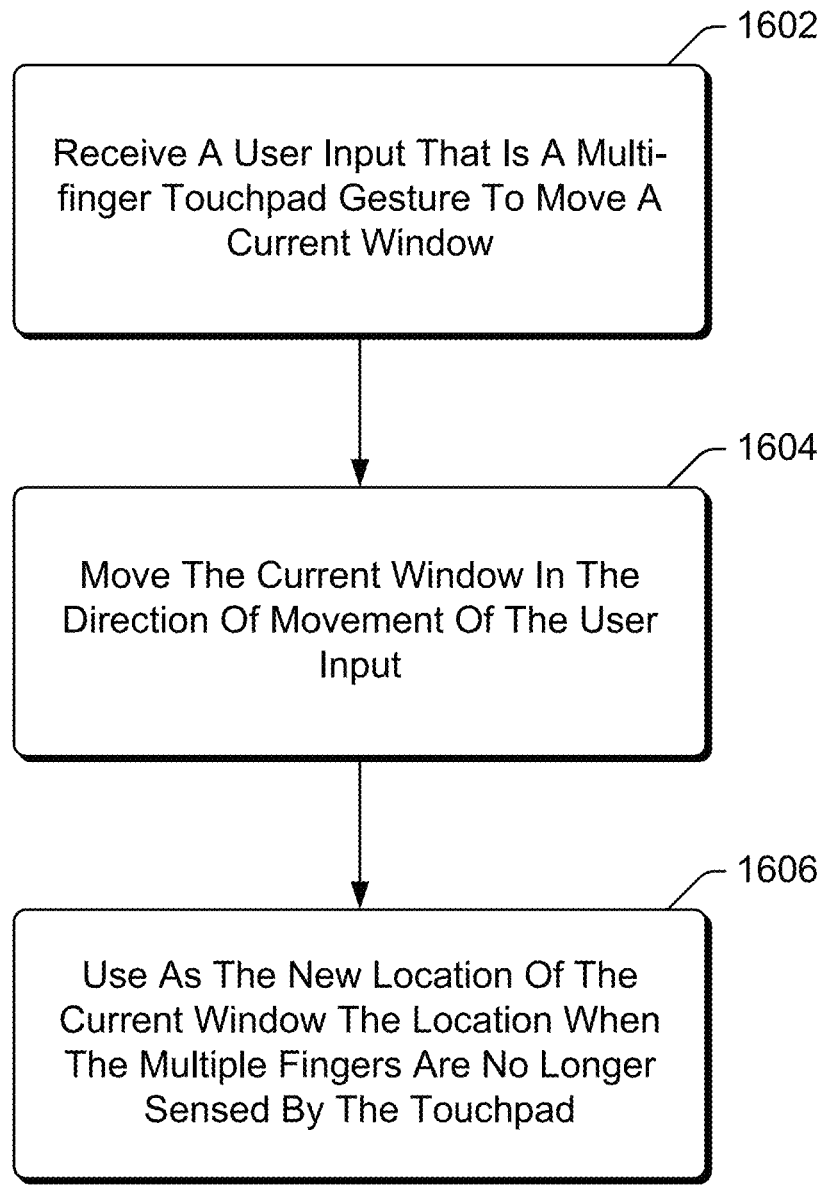
FIG. 16 is a flowchart illustrating an example process for moving a window with a multi-finger touchpad gesture in accordance with one or more embodiments.

FIG. 16 is a flowchart illustrating an example process 1600 for moving a window with a multi-finger touchpad gesture in accordance with one or more embodiments. Process 1600 can be implemented in software, firmware, hardware, or combinations thereof. Process 1600 is shown as a set of acts and is not limited to the order shown for performing the operations of the various acts. Process 1600 is an example process for moving a window with a multi-finger touchpad gesture; additional discussions of moving a window with a multi-finger touchpad gesture are included herein with reference to different figures.

In process 1600, a user input that is a multi-finger touchpad gesture to move a current window is received (act 1602). The user input is two or more fingers at the start of the gesture, and can remain the same number of fingers or the number of fingers can change during the gesture as discussed above.

In response to the multi-finger touchpad gesture being input, the current window is moved in the direction of the movement of the user input (act 1604). This movement can include freeform movement, snapping the current window to a corner or edge of the display, minimizing the current window, or maximizing the current window. In response to the multiple fingers no longer being sensed by the touchpad, the location of the current window at the time the multiple fingers are no longer sensed by the touchpad is used as the new location of the current window (act 1606).

The movement of a window with a multi-finger touchpad gesture improves usability of a computing device by advantageously providing an easy, user-friendly input mechanism for the user to move a window. The selection of a window is performed with a single motion, and the user advantageously need not be concerned with precision of the cursor in selecting or positioning a window, advantageously need not be concerned with lifting his or her fingers from the touchpad and clicking on a mouse or similar button to select the window for movement, and so forth.

Example Embodiments

Figure 17:
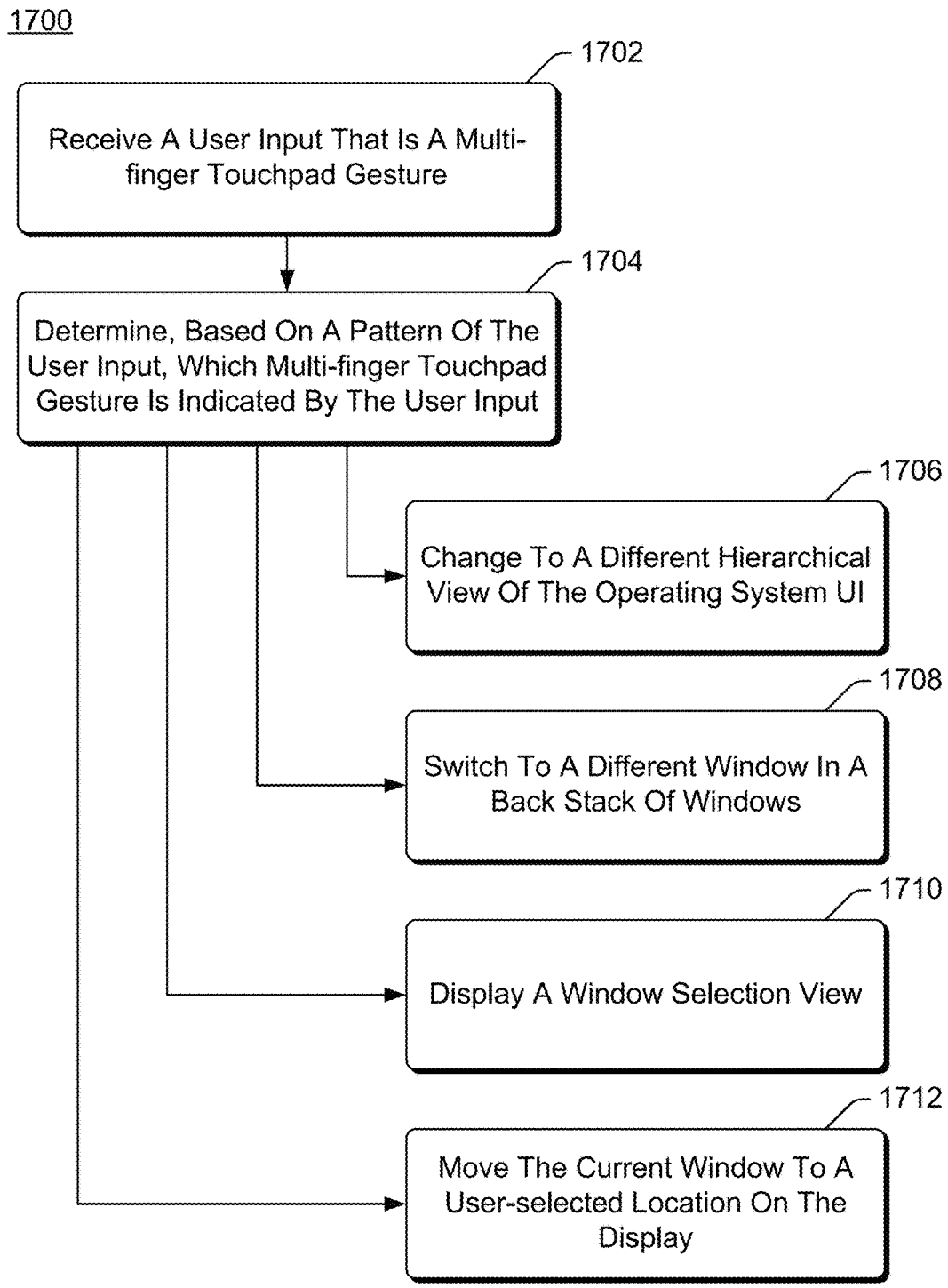
FIG. 17 is a flowchart illustrating an example process for implementing multi-finger touchpad gestures in accordance with one or more embodiments.

FIG. 17 is a flowchart illustrating an example process 1700 for implementing multi-finger touchpad gestures in accordance with one or more embodiments. Process 1700 can be implemented in software, firmware, hardware, or combinations thereof. Process 1700 is shown as a set of acts and is not limited to the order shown for performing the operations of the various acts. Process 1700 is an example process for implementing multi-finger touchpad gestures; additional discussions of implementing multi-finger touchpad gestures are included herein with reference to different figures.

In process 1700, a user input that is a multi-finger touchpad gesture is received (act 1702). The user input is two or more fingers at the start of the gesture, and can remain the same number of fingers or the number of fingers can change during the gesture as discussed above. The user input follows a particular pattern, which is movement of the finger(s) in a particular one or more directions, and optionally at a particular rate. E.g., the pattern may be movement of at least a threshold distance (e.g., 2 centimeters) in less than a threshold amount of time (e.g., 2 seconds).

A determination is made, based on the pattern of the user input, as to which of multiple multi-finger touchpad gestures is indicated by the user input (act 1704). The multiple multi-finger touchpad gestures include one or more of a traverse hierarchical views multi-finger touchpad gesture, a switch between recent windows multi-finger touchpad gesture, a traverse back stack of windows multi-finger touchpad gesture, a scrubbing window selection multi-finger touchpad gesture, and a window movement multi-finger touchpad gesture as discussed above. Although a particular set of gestures is discussed with reference to process 1700, it should be noted that not all of these gestures need be supported concurrently, and that different computing devices can support different subsets of these gestures.

In response to the multi-finger touchpad gesture being a traverse hierarchical views multi-finger touchpad gesture, the display is changed to a different hierarchical view of the operating system UI (act 1706). This changing can be performed in various manners, as discussed above.

In response to the multi-finger touchpad gesture being a switch between recent windows multi-finger touchpad gesture or a traverse back stack of windows multi-finger touchpad gesture, the display is switched to a different window in a back stack of windows (act 1708). This switching can be a switch between the two most recent windows in the back stack, or alternatively a switch to any one of multiple windows the back stack. This switching can be performed in various manners, as discussed above.

In response to the multi-finger touchpad gesture being a scrubbing window selection multi-finger touchpad gesture, a window selection view is displayed (act 1710). The window selection display includes representations of multiple windows of the computing device and via the window selection view directional movement sensed by the touchpad can result in selecting one of the multiple representations as discussed above. This can be performed in various manners, as discussed above.

In response to the multi-finger touchpad gesture being a window movement multi-finger touchpad gesture, the current window is moved to a user-selected location on the display (act 1712). This user-selected location can be snapping the window to a corner or edge of the display, maximizing or minimizing the window, moving the window to an arbitrary user-selected location, and so forth as discussed above. This movement can be performed in various manners, as discussed above.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

In the discussions herein, various different embodiments are described. It is to be appreciated and understood that each embodiment described herein can be used on its own or in connection with one or more other embodiments described herein. For example, a computing device can implement a traverse hierarchical views multi-finger touchpad gesture, a switch between recent windows multi-finger touchpad gesture, a traverse back stack of windows multi-finger touchpad gesture, a scrubbing window selection multi-finger touchpad gesture, a window movement multi-finger touchpad gesture, or any combination thereof. Additionally, embodiments of different ones of these gestures may be implemented using different numbers of fingers. For example, a traverse hierarchical views multi-finger touchpad gesture may be a gesture using three fingers, and a window movement multi-finger touchpad gesture may be a gesture using four fingers. By way of another example, a switch between recent windows multi-finger touchpad gesture may be a gesture using two fingers and a traverse back stack of windows multi-finger touchpad gesture may be a gesture using three fingers.

Further aspects of the techniques discussed herein relate to one or more of the following embodiments.

A method comprises: receiving a user input that is a gesture on a touchpad, the user input comprising multiple fingers sensed by the touchpad concurrently for at least part of the gesture and moving in a particular pattern across the touchpad; determining, based on a pattern of the user input, which of multiple multi-finger touchpad gestures is indicated by the user input, the determining including: changing, in response to the indicated gesture being a traverse hierarchical views multi-finger touchpad gesture, to a different hierarchical view of an operating system user interface of the computing device; switching, in response to the indicated gesture being a switch between recent windows multi-finger touchpad gesture or a traverse back stack of windows multi-finger touchpad gesture, to a different one of multiple windows in a back stack of windows, the back stack of windows comprising an indication of an order in which windows on the computing device were most recently a current window; displaying, in response to the indicated gesture being a scrubbing window selection multi-finger touchpad gesture, a window selection view including multiple thumbnails of windows of the computing device via which directional movement on the touchpad can result in selecting one of the multiple thumbnails and switching to the window represented by the selected thumbnail; or moving, in response to the indicated gesture being a window movement multi-finger touchpad gesture, the current window to a user-selected location on the display.

In the above described method, the determining comprising determining that the indicated gesture is a switch between recent windows multi-finger touchpad gesture or a traverse back stack of windows multi-finger touchpad gesture, and the switching comprising: identifying the current window; identifying a most recently used previous window; and switching, in response to the indicated gesture being a switch between recent windows multi-finger touchpad gesture, the most recently used previous window to be the current window.

In any one or more of the above described methods, the method further comprising repeatedly switching, in response to each subsequent user input that is a switch between recent windows multi-finger touchpad gesture, the most recently used previous window to be the current window.

In any one or more of the above described methods, the determining comprising determining that the indicated gesture is a switch between recent windows multi-finger touchpad gesture or a traverse back stack of windows multi-finger touchpad gesture, and the switching comprising, in response to the indicated gesture being a traverse back stack of windows multi-finger touchpad gesture: determining in which of two directions the multiple fingers are moved, the two directions being approximately opposite one another; making, in response to the direction of movement being a first direction of the two directions, a next more recently used window in the back stack of windows the current window; and making, in response to the direction of movement being a second direction of the two directions, a next less recently used window in the back stack of windows the current window.

In any one or more of the above described methods, the determining comprising determining that the indicated gesture is a window movement multi-finger touchpad gesture, and the moving comprising: moving the current window in a direction of movement of the user input; and using, in response to the multiple fingers no longer being sensed by the touchpad, a location of the current window when the multiple fingers are no longer sensed by the touchpad as the user-selected location of the current window.

In any one or more of the above described methods, the user input comprising freeform movement of the current window anywhere on the display.

In any one or more of the above described methods, the user input comprising movement to do one of: snap the current window to an edge of the display, minimize the window, and maximize the window.

In any one or more of the above described methods, the user input comprising movement to snap the current window to a corner of the display.

In any one or more of the above described methods, the touchpad comprising an input-only device.

In any one or more of the above described methods, the determining comprising determining that the indicated gesture is a traverse hierarchical views multi-finger touchpad gesture, and the changing comprising: determining whether a direction of movement is in one of two directions, the two directions being approximately opposite one another; changing a view of the operating system user interface to a next higher hierarchical view of multiple operating system UI hierarchical views in response to the direction of movement being a first direction of the two directions; and changing a view of the operating system user interface to a next lower hierarchical view of the multiple operating system UI hierarchical views in response to the direction of movement being a second direction of the two directions.

A device comprises: one or more processors; and one or more computer-readable storage media having stored thereon multiple instructions that, when executed by the one or more processors, cause the one or more processors to: receive a user input that is a gesture on a touchpad, the user input comprising multiple fingers concurrently moving across the touchpad for at least part of the gesture, determine whether a direction of movement is in one of two directions, the two directions being approximately opposite one another, change a view of the operating system user interface to a next higher hierarchical view of multiple operating system UI hierarchical views in response to the direction of movement being a first direction of the two directions, and change a view of the operating system user interface to a next lower hierarchical view of the multiple operating system UI hierarchical views in response to the direction of movement being a second direction of the two directions.

In the above described device, the multiple operating system UI hierarchical views comprising, in order from lower hierarchical view to higher hierarchical view: a base layer in which a desktop surface is displayed, a window view in which open windows are displayed, and a window selection view in which representations of open windows are displayed.

In any one or more of the above described devices, the multiple operating system UI hierarchical views comprising, as a next higher hierarchical view from the window selection view, a virtual desktop view in which multiple different desktops are displayed.

In any one or more of the above described devices, the first direction of the two directions comprising an up direction, and the second direction of the two directions comprising a down direction.

In any one or more of the above described devices, the device including the touchpad.

A device comprises: one or more processors; and computer-readable storage medium having stored thereon multiple instructions that, responsive to execution by the one or more processors, cause the one or more processors to perform operations including: receiving a first part of a user input that is a gesture on a touchpad, the first part of the user input comprising multiple fingers concurrently moving across the touchpad for at least part of the gesture, displaying, in response to the first part of the user input, a window selection view including multiple representations of windows of the device, receiving a second part of the user input that is a directional movement on the touchpad, at least one of the multiple fingers that was sensed by the touchpad during the first part of the user input remaining sensed by the touchpad during the second part of the user input, identifying selection of one of the windows represented in the window selection view, and making the selected one window a current window.

In any one or more of the above described devices, for each of the multiple representations, the representation of a window displaying information regarding the window.

In any one or more of the above described devices, the operations further comprising: highlighting, in response to the directional movement, different ones of the multiple representations; and the identifying comprising identifying, as the selected one window, a window represented by a highlighted representation at the time when the multiple fingers are no longer sensed by the touchpad.

In any one or more of the above described devices, the second part of the user input comprising directional movement of a number of fingers that is less than a number of fingers in the first part of the user input that is the gesture.

In any one or more of the above described devices, the touchpad being a separate device from a display device on which the window selection view is displayed.

In any one or more of the above described devices, the touchpad comprising an input-only device.

A method comprises: receiving a user input that is a gesture on a touchpad, the user input comprising multiple fingers concurrently moving across the touchpad for at least part of the gesture; identifying a current window; identifying a most recently used previous window; switching, in response to user input, the most recently used previous window to be the current window.

A method implemented in a computing device, the method comprises: receiving a user input that is a gesture on a touchpad, the user input comprising multiple fingers concurrently moving across the touchpad for at least part of the gesture; moving a current window in a direction of movement of the user input; and using, in response to the multiple fingers no longer being sensed by the touchpad, a location of the current window when the multiple fingers are no longer sensed by the touchpad as a new location of the current window.

Example System and Device

Figure 18:
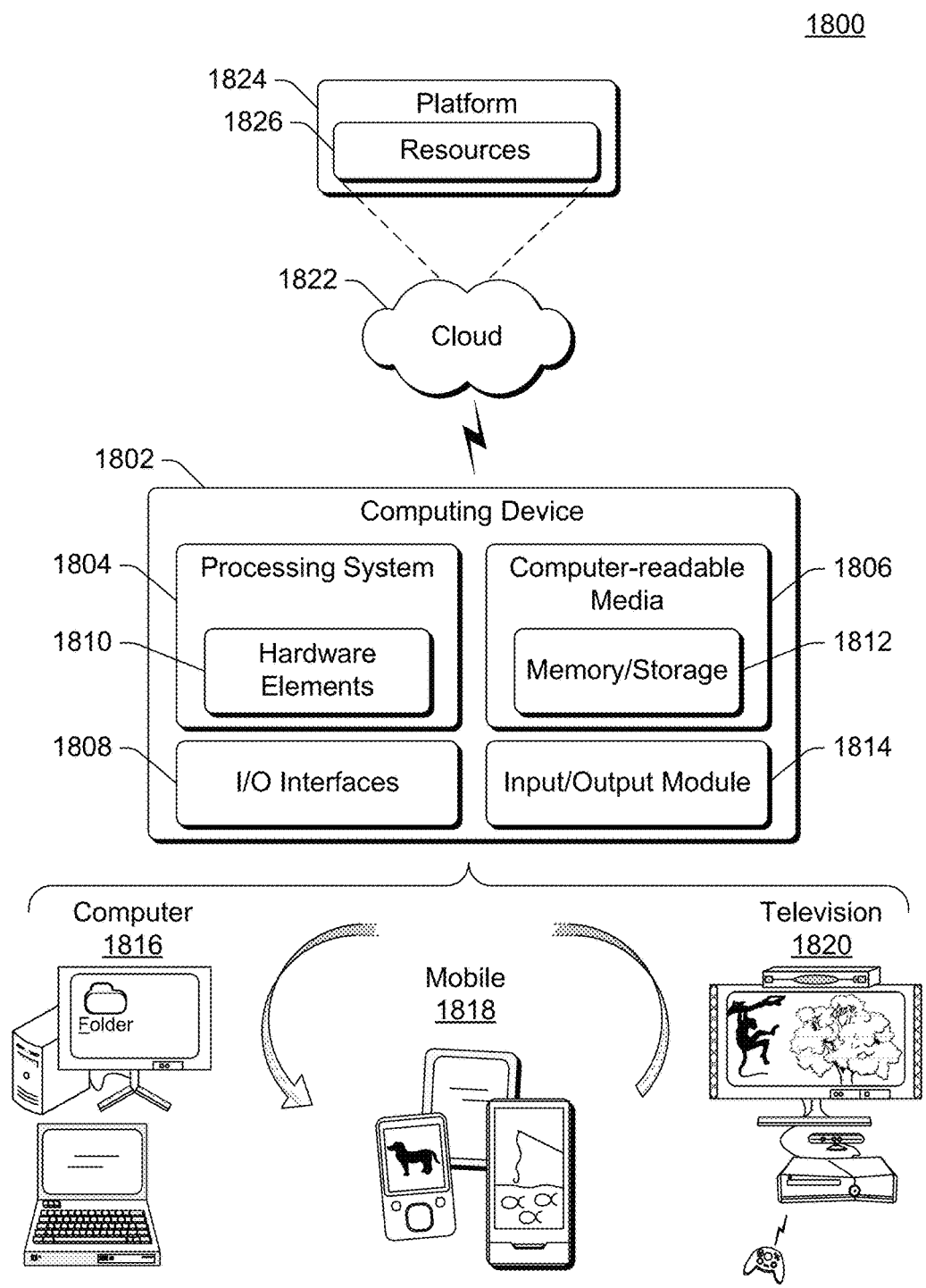
FIG. 18 illustrates an example system that includes an example computing device that is representative of one or more systems and/or devices that may implement the various techniques described herein.

FIG. 18 illustrates an example system generally at 1800 that includes an example computing device 1802 that is representative of one or more systems and/or devices that may implement the various techniques described herein. The computing device 1802 may be, for example, a server of a service provider, a device associated with a client (e.g., a client device), an on-chip system, and/or any other suitable computing device or computing system.

The example computing device 1802 as illustrated includes a processing system 1804, one or more computer-readable media 1806, and one or more I/O Interfaces 1808 that are communicatively coupled, one to another. Although not shown, the computing device 1802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware elements 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1806 is illustrated as including memory/storage 1812. The memory/storage 1812 represents memory/storage capacity associated with one or more computer-readable media. The memory/storage 1812 may include volatile media (such as random access memory (RAM)) and/or nonvolatile media (such as read only memory (ROM), Flash memory, optical disks, magnetic disks, and so forth). The memory/storage 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1802 may be configured in a variety of ways as further described below to support user interaction.

Computing device 1802 also includes an input/output module 1814. Input/output module 1814 provides functionality supporting the multi-finger touchpad gestures, including recognizing the patterns of different multi-finger touchpad gestures and causing the appropriate changes to an operating system UI in response to particular multi-finger touchpad gestures as discussed above. Input/output module 1814 can be, for example, input/output module 104 of FIG. 1 or input/output module 204 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of modules as a module that is executable by the computing device 1802 as software may be achieved at least partially in hardware, e.g., through use of computer-readable storage media and/or hardware elements 1810 of the processing system. The instructions and/or functions may be executable/operable by one or more articles of manufacture (for example, one or more computing devices 1802 and/or processing systems 1804) to implement techniques, modules, and examples described herein.

As further illustrated in FIG. 18, the example system 1800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1800, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1802 may assume a variety of different configurations, such as for computer 1816, mobile 1818, and television 1820 uses. Each of these configurations includes devices that may have generally different constructs and capabilities, and thus the computing device 1802 may be configured according to one or more of the different device classes. For instance, the computing device 1802 may be implemented as the computer 1816 class of a device that includes a personal computer, desktop computer, a multi-screen computer, laptop computer, netbook, and so on.

The computing device 1802 may also be implemented as the mobile 1818 class of device that includes mobile devices, such as a mobile phone, portable music player, portable gaming device, a tablet computer, a multi-screen computer, and so on. The computing device 1802 may also be implemented as the television 1820 class of device that includes devices having or connected to generally larger screens in casual viewing environments. These devices include televisions, set-top boxes, gaming consoles, and so on.

The techniques described herein may be supported by these various configurations of the computing device 1802 and are not limited to the specific examples of the techniques described herein. This functionality may also be implemented all or in part through use of a distributed system, such as over a "cloud" 1822 via a platform 1824 as described below.

The cloud 1822 includes and/or is representative of a platform 1824 for resources 1826. The platform 1824 abstracts underlying functionality of hardware (e.g., servers) and software resources of the cloud 1822. The resources 1826 may include applications and/or data that can be utilized while computer processing is executed on servers that are remote from the computing device 1802. Resources 1826 can also include services provided over the Internet and/or through a subscriber network, such as a cellular or Wi-Fi network.

The platform 1824 may abstract resources and functions to connect the computing device 1802 with other computing devices. The platform 1824 may also serve to abstract scaling of resources to provide a corresponding level of scale to encountered demand for the resources 1826 that are implemented via the platform 1824. Accordingly, in an interconnected device embodiment, implementation of functionality described herein may be distributed throughout the system 1800. For example, the functionality may be implemented in part on the computing device 1802 as well as via the platform 1824 that abstracts the functionality of the cloud 1822.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
one or more processors; and
one or more computer-readable storage media having stored thereon multiple instructions that, when executed by the one or more processors, cause the one or more processors to:
receive a user input that is a gesture on a touchpad, the user input comprising multiple fingers concurrently moving across the touchpad for at least part of the gesture;
determine, based on a pattern of the user input, which of multiple finger gestures is indicated by the user input, the determining including:
maximizing a current window, in response to the indicated gesture being a movement to maximize the current window received while the current window is displayed as a floating window, so the current window becomes a full-screen window on a display;
ceasing display of the current window, in response to the indicated gesture being a movement to minimize the current window received while the current window is displayed as a floating window, so the current window is not displayed on the display;
snapping the current window to the edge of the display including snapping, in response to the indicated gesture being a snap to the left-hand side movement received while the current window is displayed as a floating window, the current window to the left edge of the display; and
the snapping the current window to the edge of the display including snapping, in response to the indicated gesture being a snap to the right-hand side movement received while the current window is displayed as a floating window, the current window to the right edge of the display.

2. A device as recited in claim 1, the movement to maximize the current window comprising movement up on the touchpad, the movement to minimize the current window comprising movement down on the touchpad, the movement to snap the current window to the left-hand side comprising movement left on the touchpad, the movement to snap the current window to the right-hand side comprising movement right on the touchpad.

3. A device as recited in claim 1, the touchpad comprising an input-only device.

4. A device as recited in claim 1, the determining further comprising snapping, in response to the indicated gesture being a movement to snap the current window to a corner of the display, the current window to the corner of the display, the snapping comprising resizing the current window to a size approximately one-quarter of the display and locating the current window at a location in which each of two edges of the current window are adjacent to a different one of two edges that create the corner being snapped to.

5. A device as recited in claim 1, three different windows being displayed on the display, the three windows comprising a first window that is the current window, a second window, and a third window, the determining further including:
switching, in response to the indicated gesture being a movement to traverse a back stack of windows including the three windows, to displaying the second window as the current window, the back stack of windows comprising an indication of an order in which windows on the computing device were most recently a current window;
receiving an additional user input that is an additional gesture on the touchpad, the additional user input comprising multiple fingers concurrently moving across the touchpad for at least part of the additional gesture; and
switching, in response to the additional gesture being the movement to traverse the back stack of windows including the three windows, to displaying the third window as the current window.

6. A device comprising:
one or more processors; and
computer-readable storage medium having stored thereon multiple instructions that, responsive to execution by the one or more processors, cause the one or more processors to perform operations including:
receiving a first part of a user input that is a gesture on a touchpad, the first part of the user input comprising multiple fingers concurrently moving across the touchpad;
displaying, in response to the gesture, a window selection view including multiple representations of windows of the device;
receiving, after displaying the window selection view, a second part of the user input that is a directional movement of at least one of the multiple fingers but fewer than all of the multiple fingers on the touchpad to select one of the windows represented in the window selection view, the at least one of the multiple fingers being sensed by the touchpad during both the gesture and the directional movement, and the at least one of the multiple fingers not being lifted off the touchpad until a window from the window selection view is selected; and
making the selected one window a current window.

7. A device as recited in claim 6, for each of the multiple representations, the representation of a window displaying information regarding the window.

8. A device as recited in claim 6, the operations further comprising:
highlighting, in response to the directional movement, different ones of the multiple representations; and
identifying, as the selected one window, a window represented by a highlighted representation at the time when the at least one of the multiple fingers are no longer sensed by the touchpad.

9. A device as recited in claim 6, the touchpad being a separate device from a display device on which the window selection view is displayed.

10. A device as recited in claim 6, the touchpad comprising an input-only device.

11. A device as recited in claim 6, the operations further including:
receiving an additional user input that is an additional gesture on the touchpad, the additional user input comprising multiple fingers concurrently moving across the touchpad for at least part of the additional gesture;

maximizing the current window, in response to the additional gesture being a movement to maximize a current window received while the current window is displayed as a floating window, so the current window becomes a full-screen window;

ceasing display of the current window, in response to the additional gesture being a movement to minimize the current window received while the current window is displayed as a floating window, so the current window is not displayed;

snapping, in response to the additional gesture being a snap to the left-hand side movement received while the current window is displayed as a floating window, the current window to the left edge of the display; and snapping, in response to the indicated gesture being a snap to the right-hand side movement received while the current window is displayed as a floating window, the current window to the right edge of the display.

\* \* \* \* \*